US011017763B1

(12) United States Patent
Aggarwal et al.

(10) Patent No.: US 11,017,763 B1
(45) Date of Patent: May 25, 2021

(54) SYNTHETIC SPEECH PROCESSING

(71) Applicant: Amazon Technologies, Inc., Seattle, WA (US)

(72) Inventors: Vatsal Aggarwal, Cambridge (GB); Nishant Prateek, Cambridge (GB); Roberto Barra Chicote, Cambridge (GB); Andrew Paul Breen, Norwich (GB)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/712,466

(22) Filed: Dec. 12, 2019

(51) Int. Cl.

| | |
|---|---|
| ***G10L 15/22*** | (2006.01) |
| ***G10L 15/26*** | (2006.01) |
| ***G10L 13/08*** | (2013.01) |
| ***G10L 13/047*** | (2013.01) |
| ***G10L 13/033*** | (2013.01) |

(52) U.S. Cl.
CPC ............ *G10L 13/08* (2013.01); *G10L 13/033* (2013.01); *G10L 13/047* (2013.01)

(58) Field of Classification Search
CPC ................................ G10L 15/22; G10L 15/26
See application file for complete search history.

(56) References Cited

U.S. PATENT DOCUMENTS

2009/0177474 A1* 7/2009 Morita .................... G10L 13/07 704/260
2017/0185375 A1* 6/2017 Martel .................... G10L 15/26
2020/0051583 A1* 2/2020 Wu ......................... G10L 13/08
2020/0082807 A1* 3/2020 Kim ....................... G10L 13/047
2020/0394994 A1* 12/2020 Prenger ................. G10L 13/047

OTHER PUBLICATIONS

Bozkurt, et al., "Can VAEs Generate Novel Examples?", arXiv:1812.09624v1[cs.LG] Dec. 22, 2018.
Dinh, et al. "NICE: Non-linear independent components estimation." arXiv:1410.8516v6 [cs.LG], Apr. 10, 2015.
Kingma, et al., "Generative flow with invertible 1x1 convolutions." Advances in Neural Information Processing Systems, pp. 10215-10224, 2018.
Lorenzo-Trueba, et al., "Robust universal neural vocoding." arXiv preprint arXiv:1811.06292, 2018.
McFee, et al., "Audio and Music Signal Analysis in Python." Proceedings of the 14th Python in Science Conference (SCIPY 2015), vol. 8, 2015.
Pascual, et al. "Multi-output RNN-LSTM for multiple speaker speech synthesis with α-interpolation model." 9th ISCA Speech Synthesis Workshop:, Sunnyvale, USA, Sep. 13-15, 2016, pp. 112-117. Institute of Electrical and Electronics Engineers (IEEE), 2016.

(Continued)

*Primary Examiner* — Shreyans A Patel
(74) *Attorney, Agent, or Firm* — Pierce Atwood LLP

(57) ABSTRACT

During text-to-speech processing, a sequence-to-sequence neural network model may process text data and determine corresponding spectrogram data. A normalizing flow component may then process this spectrogram data to predict corresponding phase data. An inverse Fourier transform may then be performed on the spectrogram and phase data to create an audio waveform that includes speech corresponding to the text.

20 Claims, 19 Drawing Sheets

(56) References Cited

OTHER PUBLICATIONS

Rezende, et al. "Variational inference with normalizing flows" arXiv preprint arXiv:1505.05770, 2015.
Serra, et al. Blow: a single-scale hyperconditioned flow for non-parallel raw-audio voice conversion. arXiv preprint arXiv:1906.00794, 2019.
Van den Oord, et al. "Parallel wavenet: Fast high-fidelity speech synthesis." CoRR, abs/1711.10433, 2017. URL http://arxiv.org/abs/1711.10433.
Wang, et al. "TACOTRON: Towards End-to-End Speech Synthesis" arXiv:1703.10135v2 [cs.CL] Apr. 6, 2017.
Yoshimura, et al. "Speaker interpolation in hmm-based speech synthesis system." Fifth European Conference on Speech Communication and Technology, 1997.
Ziegler, et al. Latent Normalizing Flows for Discrete Sequences. arXiv e-prints, art.aarXiv:1901.10548v4 [stat.ML] Jun. 4, 2019.

* cited by examiner

SYNTHETIC SPEECH PROCESSING

BACKGROUND

A text-to-speech processing system may include a feature estimator that processes text data or audio data to determine features, such as power data and/or phase data, based on the text data or audio data. A vocoder may then process the feature data to determine output audio data that includes a representation of synthesized speech based on the text.

BRIEF DESCRIPTION OF DRAWINGS

For a more complete understanding of the present disclosure, reference is now made to the following description taken in conjunction with the accompanying drawings.

DETAILED DESCRIPTION

Figure 1:
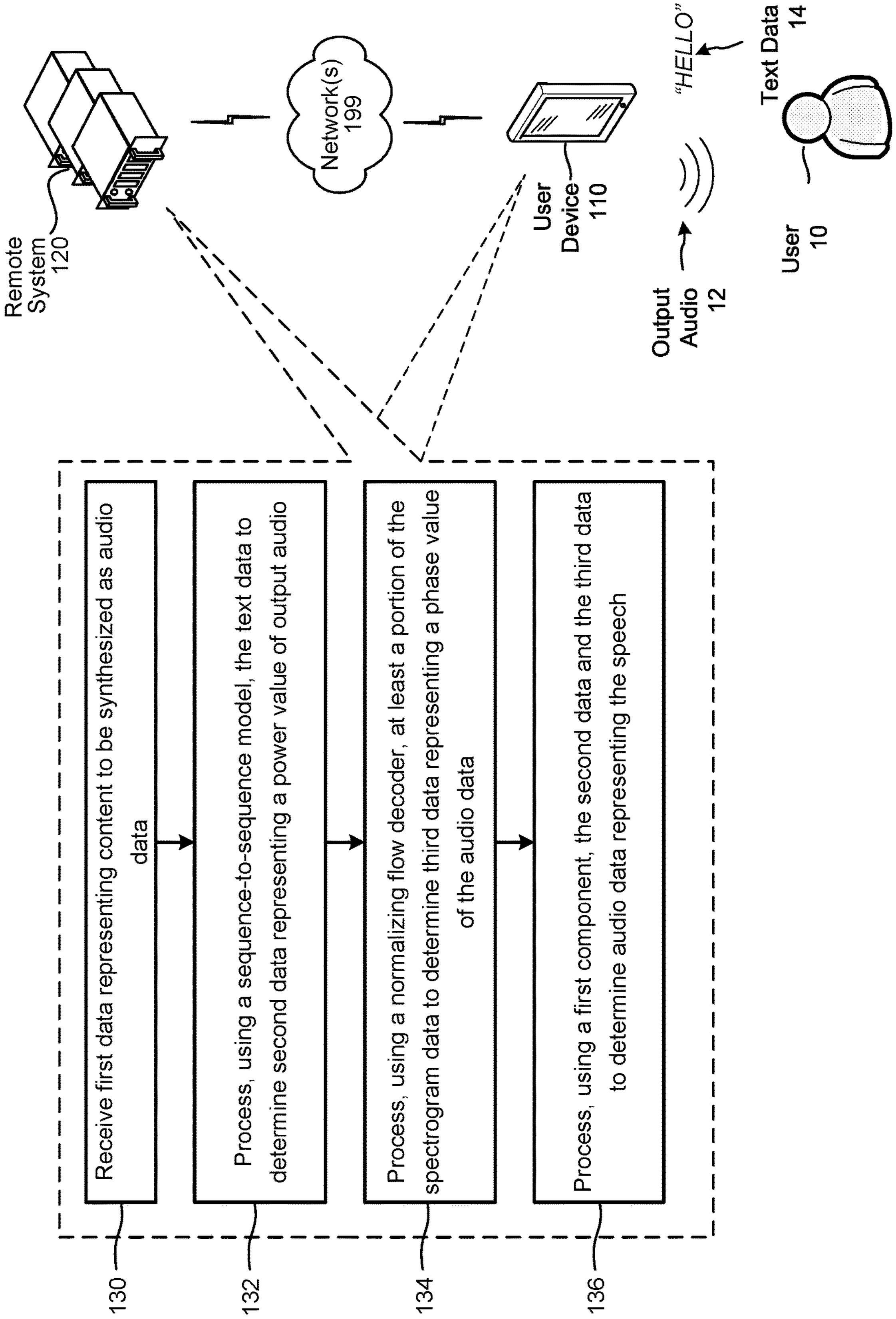
FIG. 1 illustrates a method for synthetic speech processing according to embodiments of the present disclosure.

Speech-processing systems may employ one or more of various techniques to transform text and/or other audio into synthesized speech. For example, a feature estimator model, which may be a sequence-to-sequence model, may be trained to generate audio feature data, such as Mel-spectrogram data, given input text data representing speech. The feature estimator model may be trained to generate audio feature data that corresponds to the speaking style, tone, accent, and/or other vocal characteristic(s) of a particular speaker using training data from one or more human speakers. In other embodiments, a feature extractor may be used to determine the audio feature data by processing other audio data that includes a representation of speech. A vocoder, such as a neural-network model-based vocoder, may then process the audio feature data to determine output audio data that includes a representation of synthesized speech based on the input text data.

The feature estimator model may be probabilistic and/or autoregressive; the predictive distribution of each audio sample may thus be conditioned on previous audio samples. As explained in further detail below, the feature estimator model may use causal convolutions to predict output audio; in some embodiments, the model(s) use dilated convolutions to generate an output sample using a greater area of input samples than would otherwise be possible. The feature estimator model may be trained using a conditioning network that conditions hidden layers of the model(s) using linguistic context features, such as phoneme data. The audio output generated by the model(s) may have higher audio quality than other techniques of speech synthesis, such as unit selection and/or parametric synthesis.

The vocoder may, however, process the audio feature data too slowly for a given application. The vocoder may need to create a huge number of audio samples, such as 24,000 samples per second, and may not be able to generate samples quickly enough to allow playback of live audio. The lack of speed of the vocoder may further create latencies in a text-to-speech system noticeable to a user.

In various embodiments, a generative model—referred to herein as a normalizing flow model—is used to process the output of the feature estimator model (e.g., the power spectrogram data) and generate corresponding phase data. As the terms are used herein, "frequency" refers to the inverse of the amount of time a signal takes before it repeats (e.g., one cycle), while "phase" refers to the current position of the signal in its cycle. The phase data may thus include one or more phase values that indicate the current positions of one or more signals. With both the power data from the spectrogram and the phase data from the normalizing flow model, an inverse Fourier transform component may then determine the actual output waveform by processing one or more power values and/or one or more phase values using an inverse Fourier transform. A Fourier transform processes a time-domain signal, such as an audio signal, and determines a set of sine waves that represent the frequencies that make up the signal. An inverse Fourier transform does the opposite: it takes the sine waves (or other such frequency information) in the power data and phase data and creates a time-domain signal.

Referring to FIG. 1, the user device 110 and/or remote system 120 receives (130) text data 14 (and/or audio data) for transformation into audio data that includes a representation of synthesized speech. The text data 14 may represent words that a user 10 wishes to be spoken by a synthesized voice and, for example, output by the user device 110 as output audio 12. The text data 14 may be received from the user via an input control of the user device 110, such as a keyboard and/or touchscreen, or may be generated by the system 120 during, for example, NLU processing. Any source of the text data is within the scope of the present disclosure.

The user device 110 and/or remote system 120 processes (132) the text data using a trained sequence-to-sequence model (and/or other trained model). As described in greater detail below (with reference to, e.g., FIG. 8), a sequence-to-sequence model may include an encoder, attention mechanism, and/or decoder. An acoustic model may be first used to transform the text from ordinary characters to a sequence of "phones" that represent the sounds of the words in the text. The sequence-to-sequence model may be first trained using training data, such as audio data representing words and corresponding text data representing those words.

The sequence-to-sequence model may output a series of power spectrograms, such as Mel-spectrograms, that each correspond to a certain duration of output audio. This duration, which may be, for example, 5-10 milliseconds, may be referred to as a "frame" of audio. The series of power spectrograms may correspond to overlapping time periods; for example, the sequence-to-sequence model may output a power spectrogram corresponding to 10 milliseconds of audio every two milliseconds. Each power spectrogram may include a plurality of power values that represent power information of the final audio data, such as the number, amplitude, and frequency of the Fourier components of the final audio data for that period of time. In some embodiments, each power spectrogram is a square matrix, such as an 80×80 matrix, so that it is invertible.

The user device 110 and/or remote system 120 may then process (134) the power spectrogram data using a decoder, such as a normalizing flow decoder. The normalizing flow decoder may include processing components such as a 1×1 convolution component and a squeeze component. Other components, such as an affine component and an actnorm component, may be conditioned using conditioning data. The sequence of operation of these components may be referred to as a normalizing flow. The normalizing flow decoder may thus determine phase data corresponding to input power data by determining one or more points in an embedding space and/or other type of "sampling" the embedding space that correspond to the power and then processing the selected points with the decoder. The embedding space may have been previously determined using an encoder, such as a normalizing flow encoder, and training data. The normalizing flow decoder may perform the inverse of the operations of the normalizing flow encoder (and in the opposite order). The user device 110 and/or remote system 120 may then process (136) the power data and the phase data (using, for example, an inverse Fourier transform component) to determine the audio data.

Figure 2:
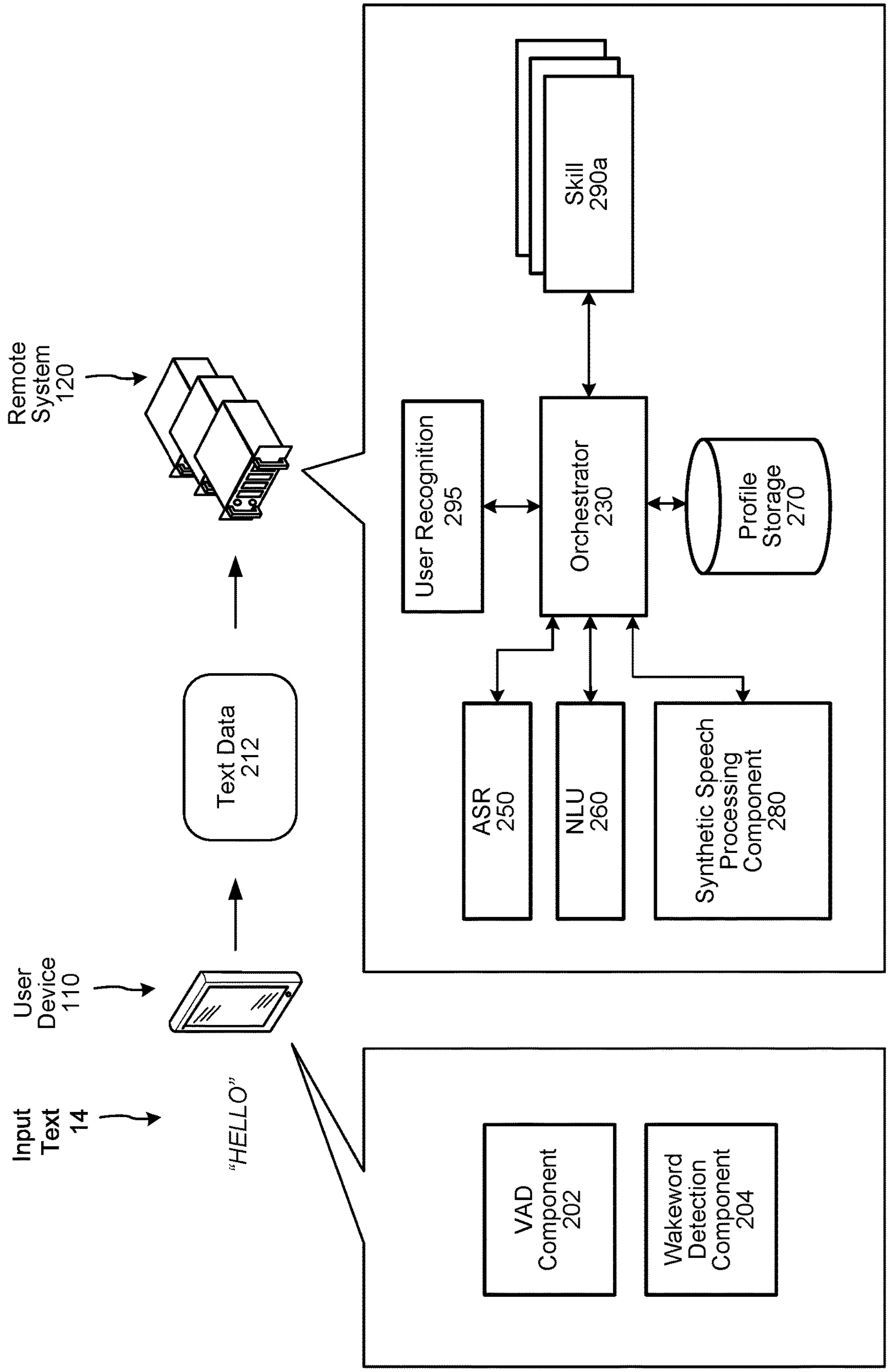
FIG. 2 illustrates components of a user device and of a remote system for synthetic speech processing according to embodiments of the present disclosure.

Referring to FIG. 2, the user device 110 may receive the input text 14 and transmit corresponding text data 212 to the remote system 120. In various embodiments, the user device 110 may instead or in addition send audio data to the remote system 120. For example, a user 10 may wish to send audio data representing speech to the remote system 120 and cause the remote system to synthesize speech using the words represented in the transmitted audio. The user device 110 may thus, using an audio capture component such as a microphone and/or array of microphones, determine corresponding audio data that may include a representation of an utterance of the user 10. Before processing the audio data, the user device 110 may use various techniques to first determine whether the audio data includes a representation of an utterance of the user 10. For example, the device 110 may use a voice-activity detection (VAD) component 202 to determine whether speech is represented in the audio data based on various quantitative aspects of the audio data, such as the spectral slope between one or more frames of the audio data, the energy levels of the audio data in one or more spectral bands the signal-to-noise ratios of the audio data in one or more spectral bands and/or other quantitative aspects. In other examples, the VAD component 202 may be a trained classifier configured to distinguish speech from background noise. The classifier may be a linear classifier, support vector machine, and/or decision tree. In still other examples, hidden Markov model (HMM) and/or Gaussian mixture model (GMM) techniques may be applied to compare the audio data to one or more acoustic models in speech storage; the acoustic models may include models corresponding to speech, noise (e.g., environmental noise and/or background noise), and/or silence.

The user device 110 may instead or in addition determine that the audio data represents an utterance by using a wakeword-detection component 204. If the VAD component 202 is being used and it determines the audio data includes speech, the wakeword-detection component 204 may only then activate to process the audio data to determine if a wakeword is likely represented therein. In other embodiments, the wakeword-detection component 204 may continually process the audio data (in, e.g., a system that does not include a VAD component.) The device 110 may further include an ASR component for determining text data corresponding to speech represented in the input audio 12 and may send this text data to the remote system 120.

The trained models of the VAD component 202 and/or wakeword-detection component 204 may be CNNs, RNNs, acoustic models, hidden Markov models (HMMs), and/or classifiers. These trained models may apply general large-vocabulary continuous speech recognition (LVCSR) systems to decode the audio signals, with wakeword searching conducted in the resulting lattices and/or confusion networks. Another approach for wakeword detection builds HMMs for each key wakeword word and non-wakeword speech signals respectively. The non-wakeword speech includes other spoken words, background noise, etc. There may be one or more HMMs built to model the non-wakeword speech characteristics, which may be referred to as filler models. Viterbi decoding may be used to search the best path in the decoding graph, and the decoding output is further processed to make the decision on wakeword presence. This approach can be extended to include discriminative information by incorporating a hybrid DNN-HMM decoding framework. In another example, the wakeword-detection component may use convolutional neural network (CNN)/recursive neural network (RNN) structures directly, without using a HMM. The wakeword-detection component may estimate the posteriors of wakewords with context information, either by stacking frames within a context window for a DNN, or using a RNN. Follow-on posterior threshold tuning and/or smoothing may be applied for decision making. Other techniques for wakeword detection may also be used.

The device 110 and/or system 120 may include a synthetic speech processing component 280 that generates output audio data from text data and/or input audio data. The synthetic speech processing component 280 may use a sequence-to-sequence model (and/or other trained model) to generate power spectrogram data based on the input text data and a normalizing flow component to process the power spectrogram data and thereby estimate the phase of the output audio data. The synthetic speech processing component 280 is described in greater detail below with reference to FIGS. 3 and 4A-4D.

The remote system 120 may be used for additional audio processing after the user device 110 detects the wakeword and/or speech, potentially begins processing the audio data with ASR and/or NLU, and/or sends corresponding audio data. The remote system 120 may, in some circumstances, receive the audio data from the user device 110 (and/or other devices and/or systems) and perform speech processing thereon. Each of the components illustrated in FIG. 2 may thus be disposed on either the user device 110 and/or the remote system 120. The remote system 120 may be disposed in a location different from that of the user device 110 (e.g., a cloud server) and/or may be disposed in the same location as the user device 110 (e.g., a local hub server).

The audio data may be sent to, for example, an orchestrator component 230 of the remote system 120. The orchestrator component 230 may include memory and logic that enables the orchestrator component 230 to transmit various pieces and forms of data to various components of the system 120. The orchestrator component 230 may, for example, send audio data to a speech-processing component. The speech-processing component may include different components for different languages. One or more components may be selected based on determination of one or more languages. A selected ASR component 250 of the speech processing component transcribes the audio data into text data representing one more hypotheses representing speech contained in the audio data. The ASR component 250 may interpret the utterance in the audio data based on a similarity between the utterance and pre-established language models. For example, the ASR component 250 may compare the audio data with models for sounds (e.g., subword units, such as phonemes) and sequences of sounds to identify words that match the sequence of sounds spoken in the utterance represented in the audio data. The ASR component 250 sends (either directly or via the orchestrator component 230) the text data generated thereby to a corresponding selected NLU component 260 of the speech processing component. The text data output by the ASR component 250 may include a top scoring hypothesis and/or may include an N-best list including multiple hypotheses. An N-best list may additionally include a score associated with each hypothesis represented therein. Each score may indicate a confidence of ASR processing performed to generate the hypothesis with which it is associated.

The NLU component 260 attempts, based on the selected language, to make a semantic interpretation of the words represented in the text data input thereto. That is, the NLU component 260 determines one or more meanings associated with the words represented in the text data based on individual words represented in the text data. The NLU component 260 may determine an intent (e.g., an action that the user desires the user device 110 and/or remote system 120 to perform) represented by the text data and/or pertinent pieces of information in the text data that allow a device (e.g., the device 110, the system 120, etc.) to execute the intent. For example, if the text data corresponds to "play Africa by Toto," the NLU component 260 may determine a user intended the system to output the song Africa performed by the band Toto, which the NLU component 260 determines is represented by a "play music" intent. The NLU component 260 may further process the speaker identifier 214 to determine the intent and/or output. For example, if the text data corresponds to "play my favorite Toto song," and if the identifier corresponds to "Speaker A," the NLU component may determine that the favorite Toto song of Speaker A is "Africa."

The orchestrator component 230 may send NLU results data to a speechlet component 290 associated with the intent. The speechlet component 290 determines output data based on the NLU results data. For example, if the NLU results data includes intent data corresponding to the "play music" intent and tagged text corresponding to "artist: Toto," the orchestrator component 230 may send the NLU results data to a music speechlet component, which determines Toto music audio data for output by the system.

The speechlet may be software such as an application. That is, a speechlet may enable the device 110 and/or system 120 to execute specific functionality in order to provide data and/or produce some other output requested by the user 10. The device 110 and/or system 120 may be configured with more than one speechlet. For example, a weather speechlet may enable the device 110 and/or system 120 to provide weather information, a ride-sharing speechlet may enable the device 110 and/or system 120 to book a trip with respect to a taxi and/or ride sharing service, and a food-order speechlet may enable the device 110 and/or system 120 to order a pizza with respect to a restaurant's online ordering system. In some instances, a speechlet 290 may provide output text data responsive to received NLU results data.

The device 110 and/or system 120 may include a speaker recognition component 295. The speaker recognition component 295 may determine scores indicating whether the audio data originated from a particular user or speaker. For example, a first score may indicate a likelihood that the audio data is associated with a first synthesized voice and a second score may indicate a likelihood that the speech is associated with a second synthesized voice. The speaker recognition component 295 may also determine an overall confidence regarding the accuracy of speaker recognition operations. The speaker recognition component 295 may perform speaker recognition by comparing the audio data to stored audio characteristics of other synthesized speech. Output of the speaker recognition component 295 may be used to inform NLU processing as well as processing performed by speechlets 290.

The system 120 may include a profile storage 270. The profile storage 270 may include a variety of information related to individual users and/or groups of users that interact with the device 110. The profile storage 270 may similarly include information related to individual speakers and/or groups of speakers that are not necessarily associated with a user account. The profile storage 270 of the user device 110 may include user information, while the profile storage 270 of the remote system 120 may include speaker information.

The profile storage 270 may include one or more profiles. Each profile may be associated with a different user and/or speaker. A profile may be specific to one user or speaker and/or a group of users or speakers. For example, a profile may be a "household" profile that encompasses profiles associated with multiple users or speakers of a single household. A profile may include preferences shared by all the profiles encompassed thereby. Each profile encompassed under a single profile may include preferences specific to the user or speaker associated therewith. That is, each profile may include preferences unique from one or more user profiles encompassed by the same user profile. A profile may be a stand-alone profile and/or may be encompassed under another user profile. As illustrated, the profile storage 270 is implemented as part of the remote system 120. The user profile storage 270 may, however, may be disposed in a different system in communication with the user device 110 and/or system 120, for example over the network 199. Profile data may be used to inform NLU processing as well as processing performed by a speechlet 290.

Each profile may include information indicating various devices, output capabilities of each of the various devices, and/or a location of each of the various devices 110. This device-profile data represents a profile specific to a device. For example, device-profile data may represent various profiles that are associated with the device 110, speech processing that was performed with respect to audio data received from the device 110, instances when the device 110 detected a wakeword, etc. In contrast, user- or speaker-profile data represents a profile specific to a user or speaker.

Figure 3:
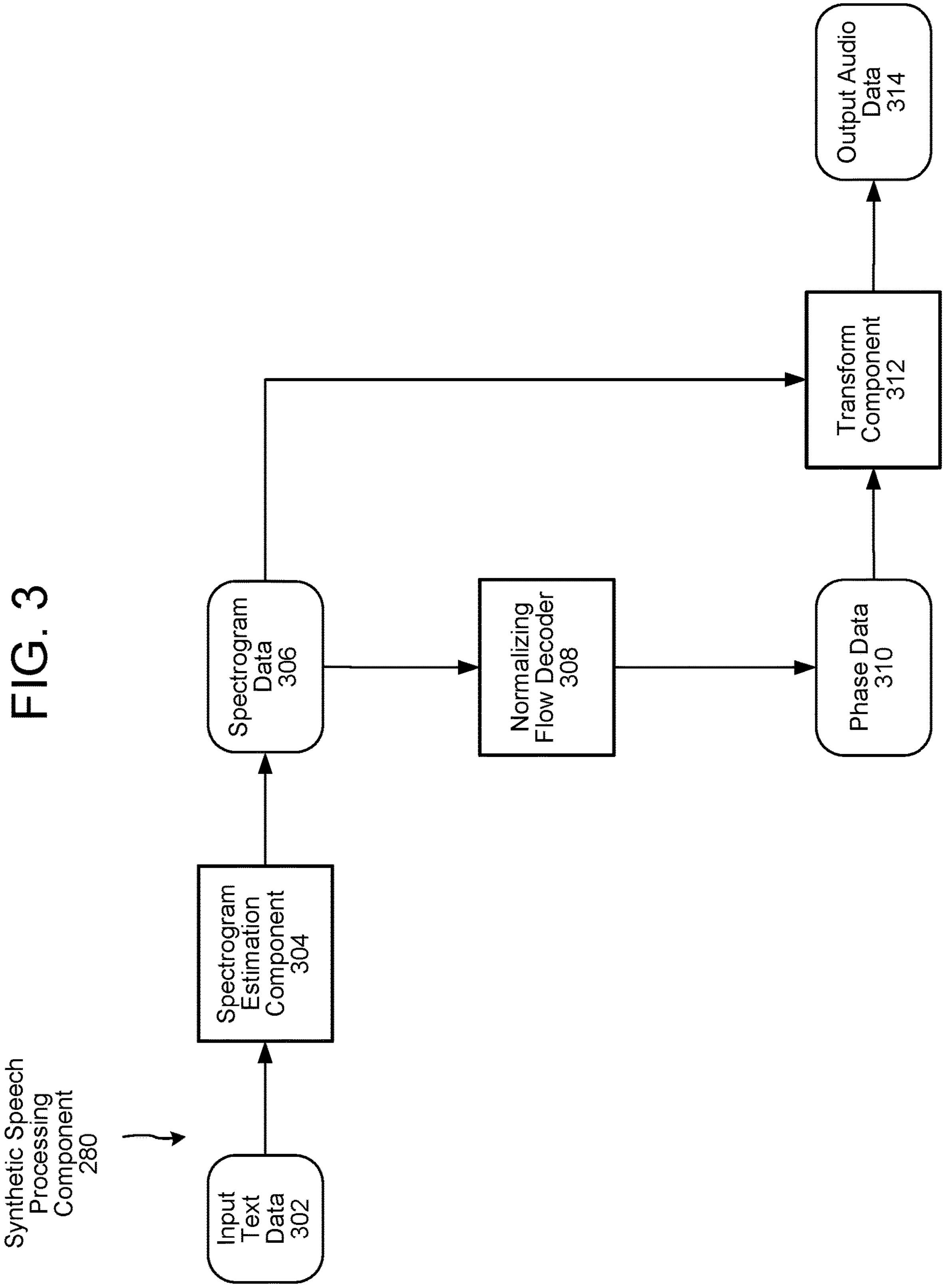
FIG. 3 illustrates components of a synthetic speech processing system according to embodiments of the present disclosure.

FIG. 3 illustrates a system for synthetic speech processing in accordance with the present disclosure. A power spectrogram estimation component 304—e.g., the sequence-to-sequence model described herein and/or other trained model—processes text data 302 to determine power spectrogram data 306. Further discussion of the spectrogram estimation component 304 appears below with reference to FIG. 8. A normalizing flow decoder 308 processes at least a portion of the power spectrogram data 306 (and/or other data derived therefrom) to determine phase data 310. A transform component 312 then processes both the power spectrogram data 306 and the phase data 310 to determine output audio data 314, which includes a representation of the text data 302. Further details of the operation of these components appears below with reference to FIGS. 4A-4B.

Figure 4A:
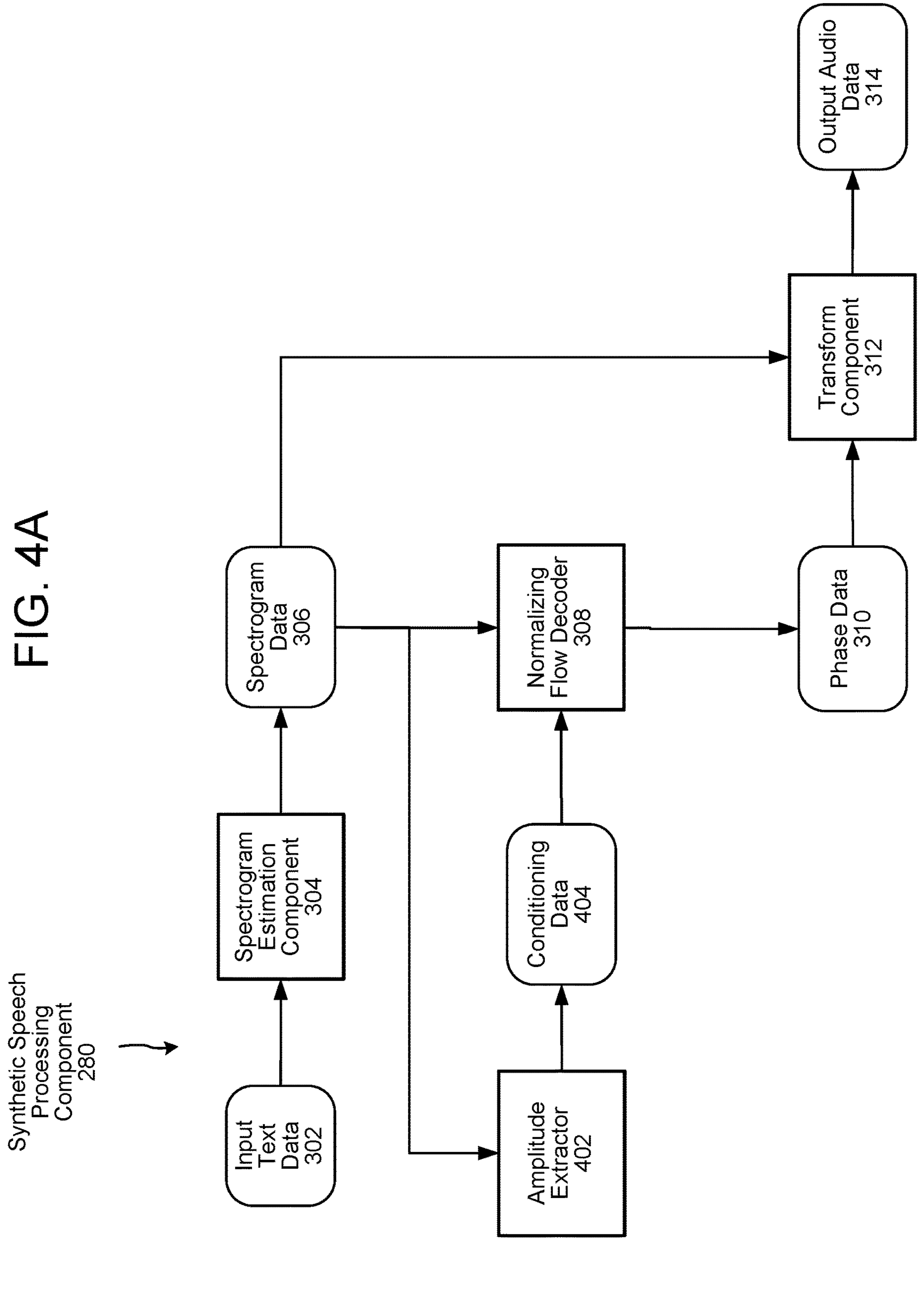
FIGS. 4A, 4B, 4C, and 4D illustrate components of synthetic speech processing systems according to embodiments of the present disclosure.

FIG. 4A illustrates embodiments of the present disclosure in which the normalizing flow decoder 308 is conditioned using a processed form of the power spectrogram data 306. For each spectrogram of the power spectrogram data 306, an amplitude extraction component 402 extracts amplitude information corresponding to the signals represented in the power spectrogram. For example, for each component of the power spectrogram, a corresponding amplitude is determined. The amplitudes may be numbers that represent a loudness of each component, such as a loudness in decibels. The amplitude information may instead or in addition be normalized to a highest amplitude (e.g., the amplitudes may be normalized to range from 0.0-1.0).

The amplitudes may then be used as conditioning data 404. The conditioning data may be received by a layer of the normalizing flow decoder 308 and used to process the normalized encoded data 504. For example, the affine coupling layer **706*b* of FIG. 7B (described below) may apply one or more scaling factors and/or bias factors to the normalized encoded data 504**; the scaling factors and/or bias factors may be specified by and/or derived from the conditioning data.

In various embodiments, the normalized encoded data represents a data distribution, such as a Gaussian distribution. When the normalizing flow decoder 308 receives the power spectrogram data 306, it may select or "sample" this Gaussian distribution to identify a portion of the normalized encoded data 504 and/or intermediate encoded data **608*a* corresponding to a particular spectrogram of the power spectrogram data 306. The normalizing flow decoder 308 may then process the selected normalized encoded data 504 and/or intermediate encoded data 608*a* in accordance with the normalizing flows described herein, while conditioning the flows using the conditioning data 404. The result of this conditioned flow process may be the phase data 310**.

The normalized encoded data 504 and/or intermediate encoded data **608*a* may be determined by processing training data, such as phase and power data corresponding to speech, using the normalizing flow encoder 420. The normalizing flow encoder 420 may be trained to generate the normalized encoded data 504 by maximizing a log-likelihood of the normalizing flow encoder 420 to thereby maximize the likelihood that the generated phase data 310 accurately represents the phase associated with the power spectrogram data 306**. This process may also be referred to as a density estimation process.

Figure 4B:
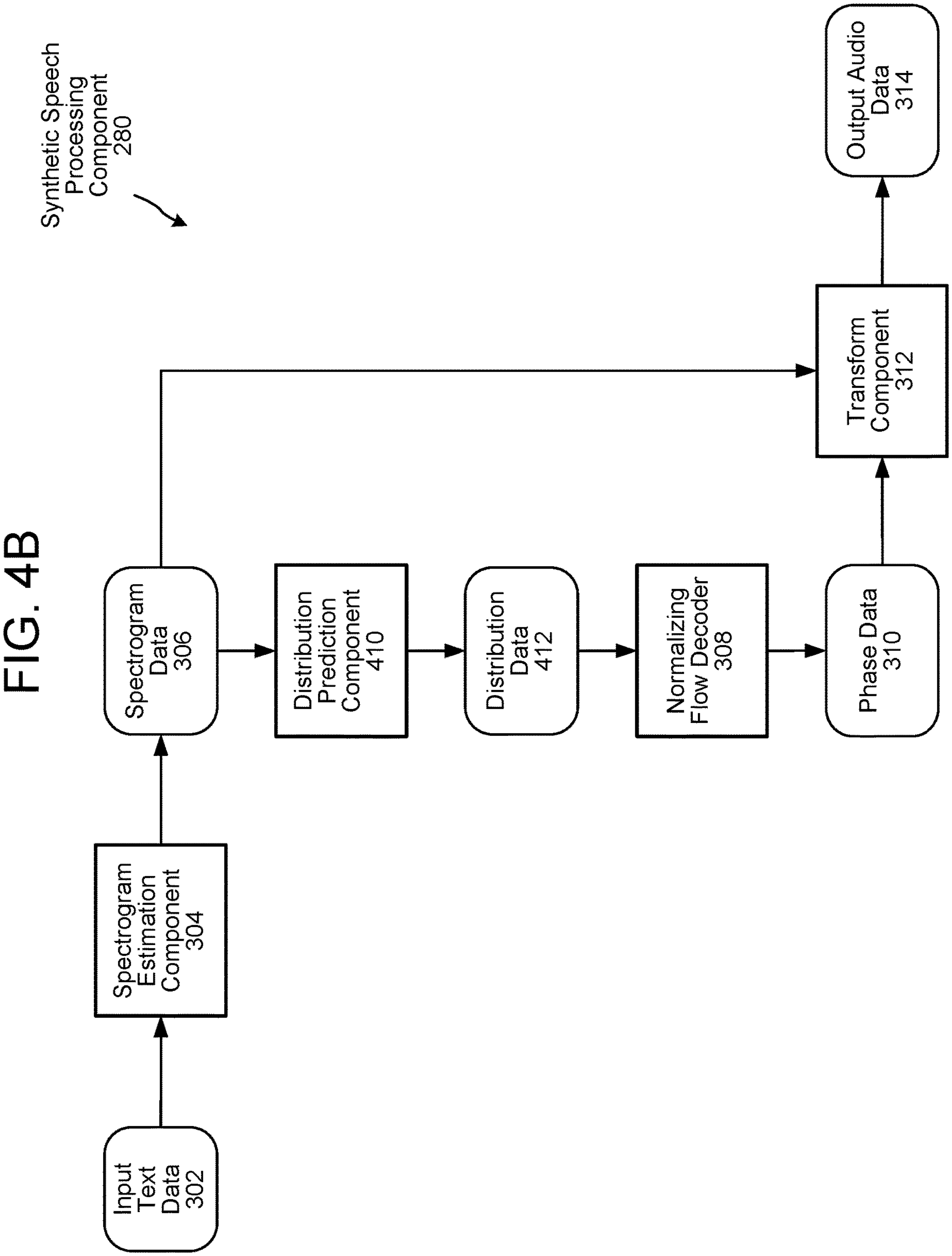

FIG. 4B illustrates embodiments of the present disclosure in which the normalizing flow decoder 308 dynamically determines or changes the normalized encoded data 504 in accordance with the power spectrogram data 306. In these embodiments, a distribution prediction component 410 is a model trained to predict a distribution given a spectrogram of the power spectrogram data 306.

The distribution prediction component 410 may, for example, predict distribution data 412 that includes parameters that define a data distribution, such as a Gaussian distribution. In some embodiments, these predicted parameters are Gaussian sigma ($\sigma$) parameters and Gaussian mu ($\mu$) parameters. The normalizing flow decoder 308 may then sample the normalized encoded data 504 using a distribution having these parameters and then, as described above, create the phase data 310 by performing the steps of the normalizing flow using this sample.

In these embodiments, the normalizing flow encoder 420 may be trained to determine the normalized encoded data 504 by processing training data, such as phase and power data. The distribution prediction component 410 may process the power data to predict a first set of Gaussian parameters. The normalizing flow encoder 420 may process the phase data to determine a second set of Gaussian parameters. The sets of parameters may be compared to find a difference, and the distribution prediction component 410 and/or the normalizing flow encoder 420 may be trained to minimize this difference.

Figure 4C:
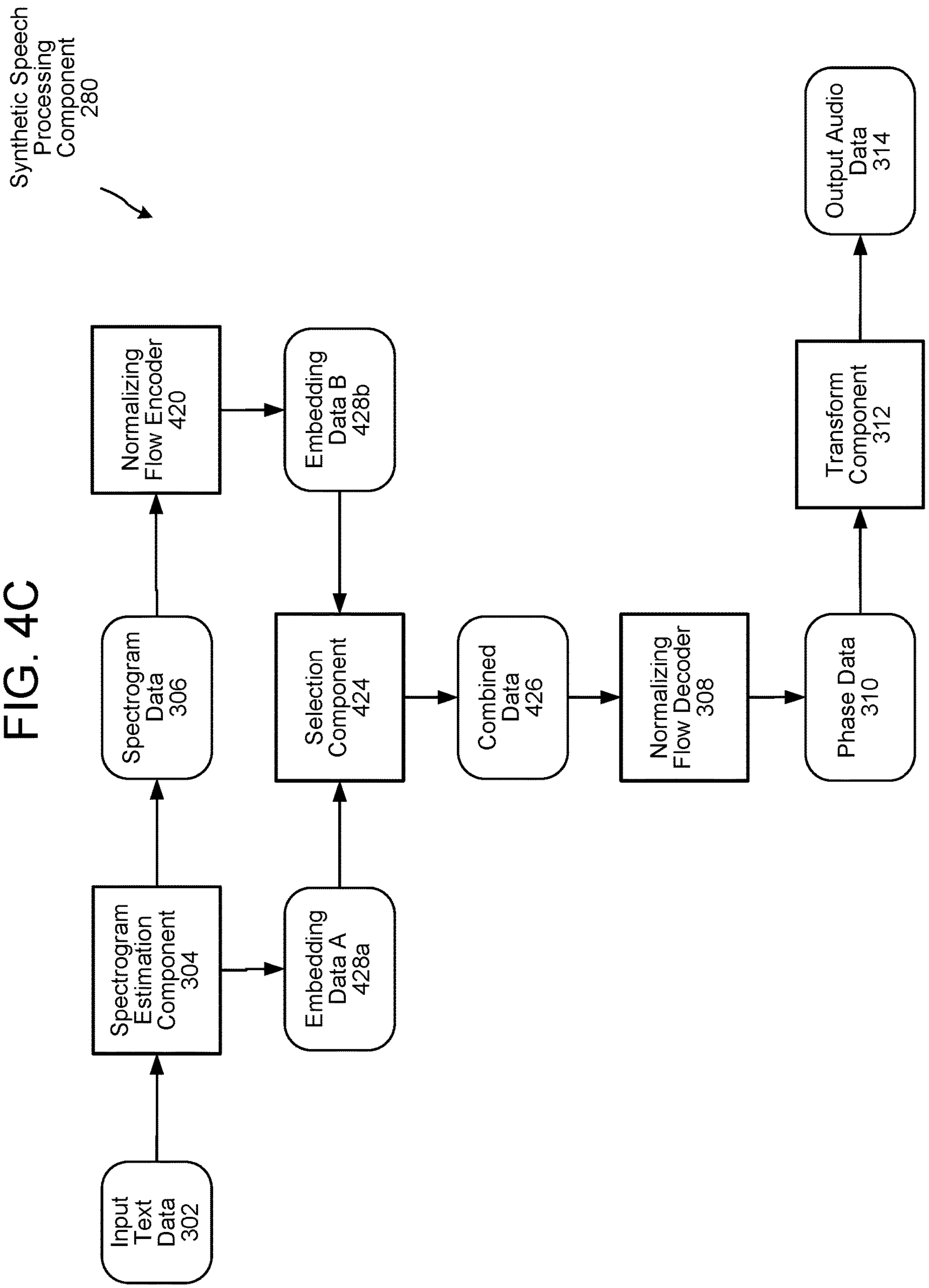

FIG. 4C illustrates embodiments of the present disclosure in which the spectrogram estimation component 304 determines a first set of embedding data A **428*a* in addition to determining the power spectrogram data 306. The normalizing flow encoder 420 processes the power spectrogram data 306—which may include both power and phase data—to determine a second set of embedding data B 428*b*. A selection component 424 may then process both the embedding data A 428*a* and the embedding data B 428*b* and may select a first subset of the embedding data A and a second subset of the embedding data B 428*b* for inclusion in a set of combined data 426**.

In making this selection, the selection component 424 may determine a mean value for each of the sets of embedding data **428*a*, 428*b* and compare values from one or both sets 428*a*, 428*b* to the mean. If, for example, a value of the second set of embedding data B 428*b* has a variance compared to the mean that satisfies a condition (e.g., is greater than a threshold), the selection component 424 may select a corresponding value of the first set of embedding data A 428 for inclusion in the combined data 426. In other words, the selection component 424 selects values having low variance from the second set of embedding data B 428*b* and values having high variance from the first set of embedding data A 428*a* for inclusion in the combined data 426**.

Figure 4D:
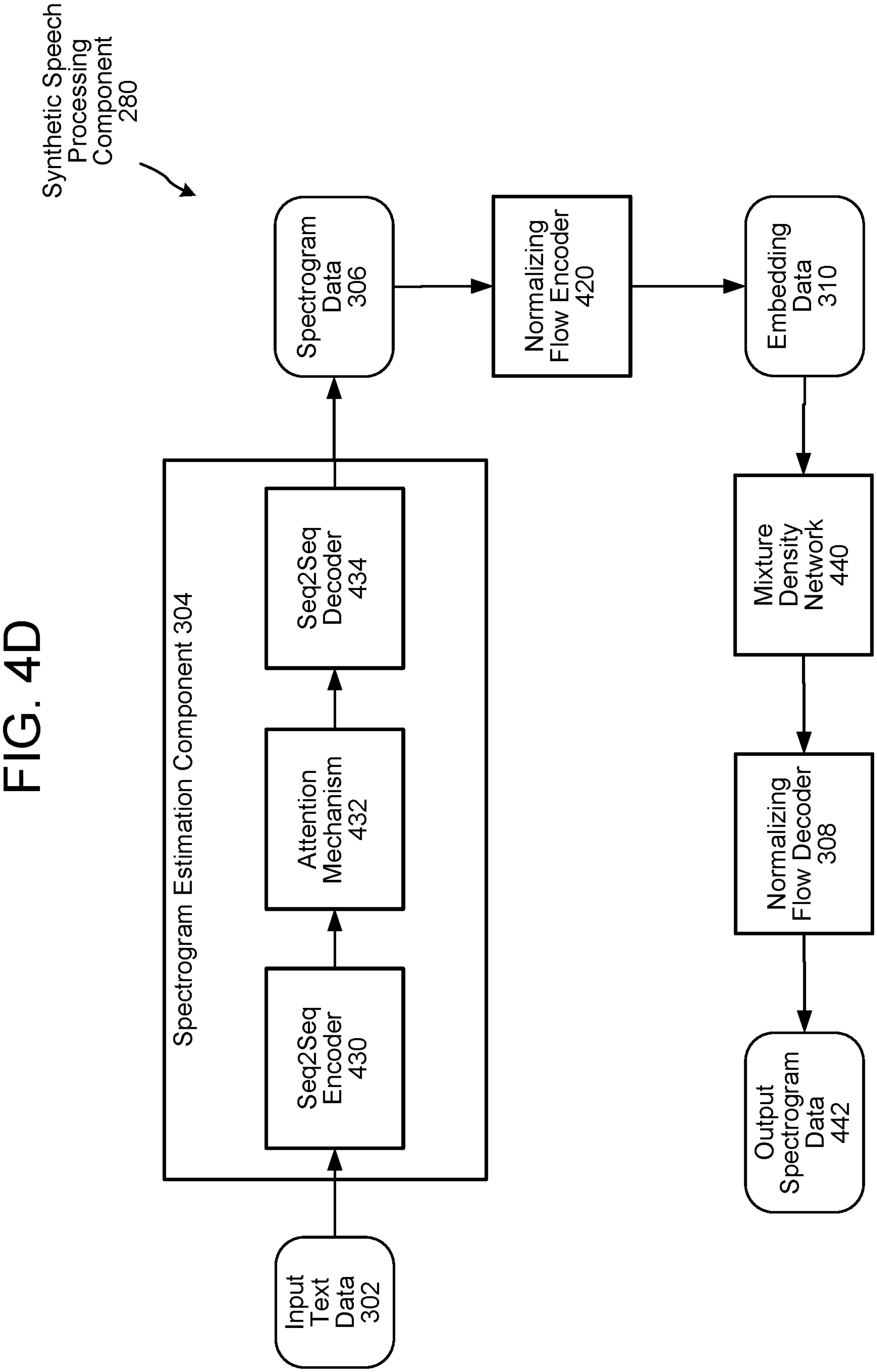
Figure 5A:
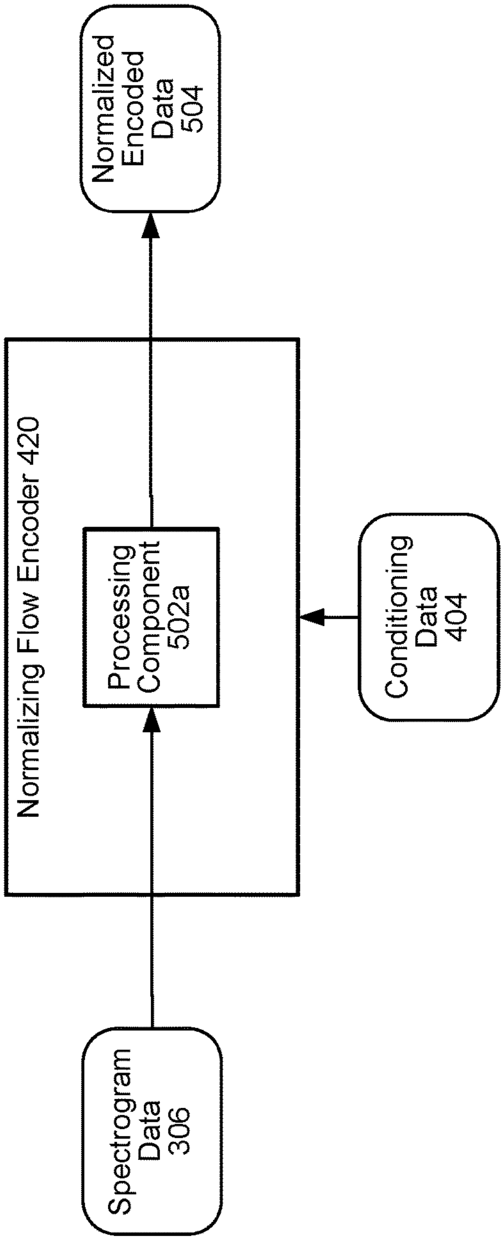
FIGS. 5A and 5B illustrate a normalizing flow encoder and decoder according to embodiments of the present disclosure.

FIG. 4D illustrates embodiments of the present disclosure in which the normalizing flow encoder 420 processes the spectrogram data 306 frame by frame to create the embedding data 310 (as shown in, for example, FIG. 5A). An trained model 440, which may be a mixture density network, may then process the embedding data 310 to determine a data distribution. The output of the mixture density network 440 may represent a distribution of the embedding data 310. The normalizing flow encoder 420 may then sample this distribution and decode the sampled data in accordance with the normalizing flow process described herein to determine output spectrogram data 442.

In other embodiments, instead of or in addition to use of the trained model 440, the sequence-to-sequence decoder 434 is trained to produce the normalized encoded data 504 (like the normalizing flow encoder 420) in lieu of (and/or in addition to) the power spectrogram data 306. The dimensions of the normalized encoded data 504 may be more independent than those of the power spectrogram data 306, which may make training of the sequence-to-sequence decoder 434 easier in that it may be trained with less training data and/or may more accurately predict normalized encoded data 504 that more closely reflects desired output audio data 314.

Figure 5B:
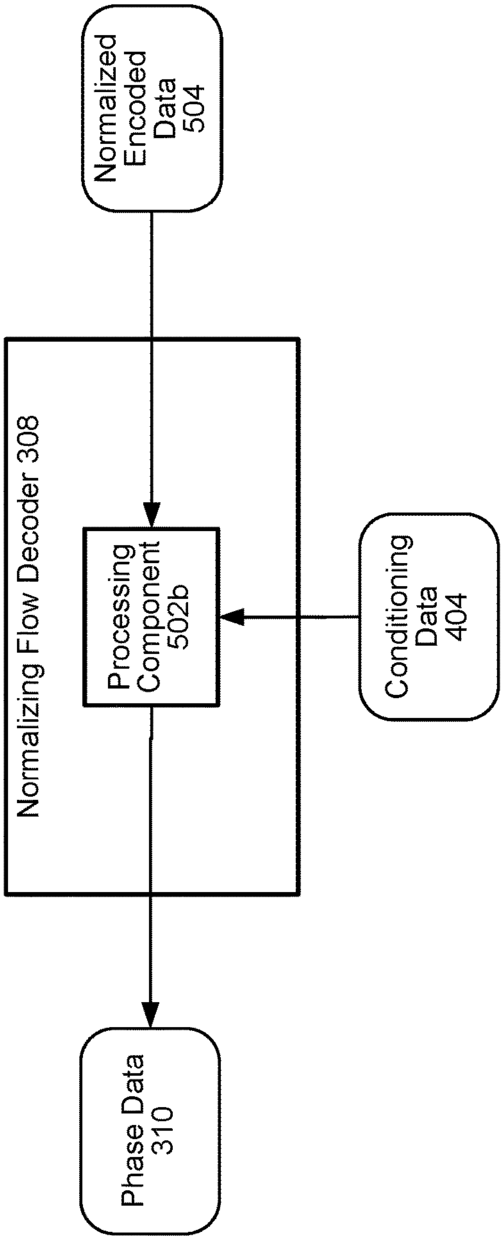

FIGS. 5A and 5B illustrate a normalizing flow encoder 420 and a normalizing flow decoder 308, respectively, according to embodiments of the present disclosure. Referring first to FIG. 5A, the normalizing flow encoder 420 may include a first processing component 502*a* that receives and processes the power spectrogram data 306 and the conditioning data 404. As described above, the power spectrogram data 306 may be a plurality of spectrograms, each corresponding to a frame or frames of the audio data, while the conditioning data 404 may be a vector of fixed-point numbers. The same conditioning data 404 may thus be used to process each of the plurality of spectrograms; such use may be referred to as "conditioning" the power spectrogram data 306. "Conditioning" refers to subjecting a neural network, such as the processing component 502*a*, to a set of constraints or "conditions," in this case the values of the conditioning data 404. The processing component 502*a* is explained in greater detail with reference to FIGS. 6A, 6B, 7A, and 7B. As explained in those figures, the processing component 502*a* processes the power spectrogram data 306, conditioned upon the conditioning data 404, to generate normalized encoded data 504.

FIG. 5B illustrates the normalizing flow decoder 308 processing the normalized encoded data 504 to generate the phase data 310. As explained below with reference to the above-referenced figures, the first processing component 502*a* may process the power spectrogram data 306 with a first set of operations in a first order, while the second processing component 502*b* may process the normalized encoded data 404 with a second set of operations that are the inverse of the first set of operations, and in a second order that is the reverse of the first order. In other words, the first processing component 502*a* may process the power spectrogram data 306 to encode features into the normalized encoded data 504, and the second processing component 502*b* may process the determined normalized encoded data 404 to extract or "sample" features associated with phase data 310.

Figure 6A:
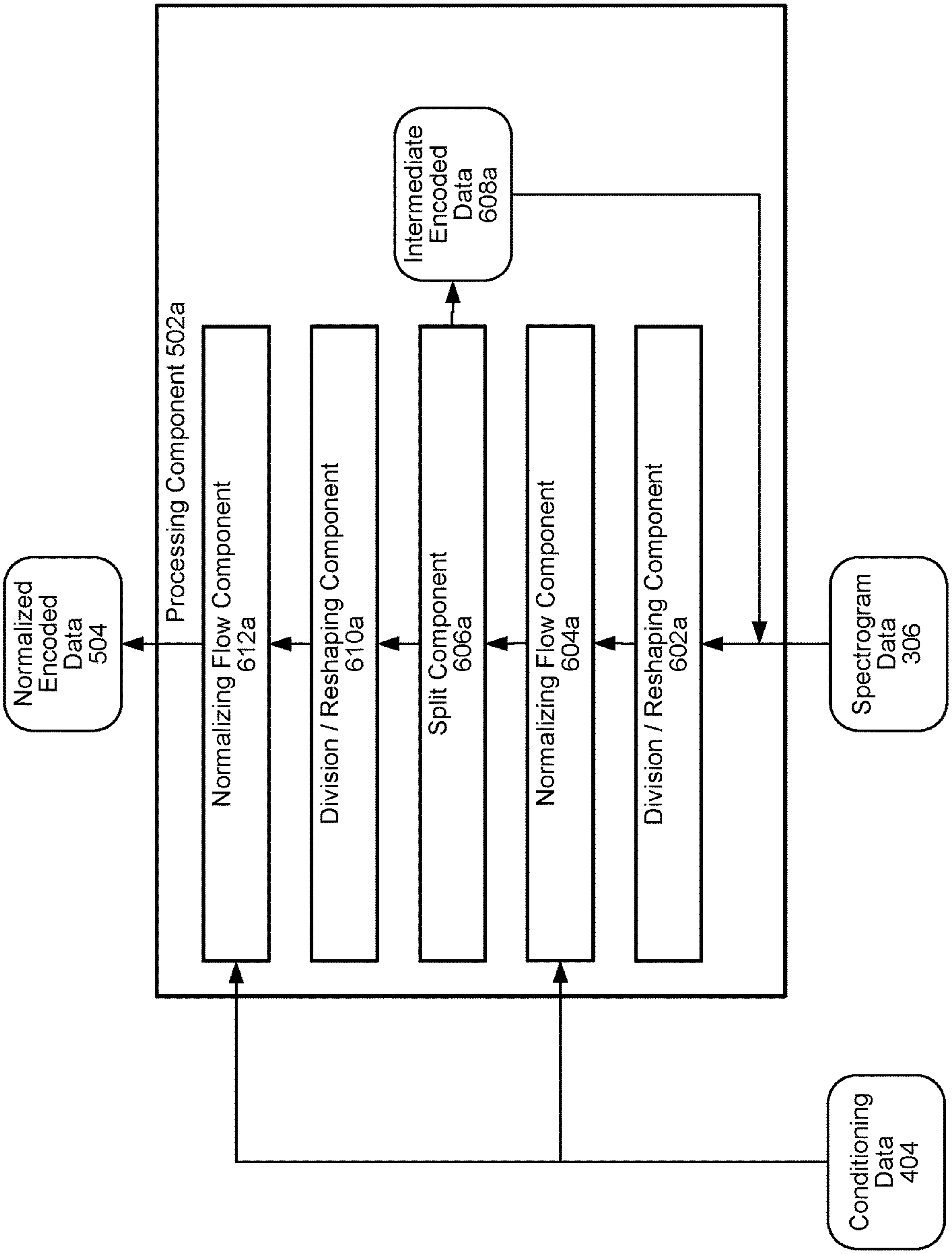
FIGS. 6A and 6B illustrate voice processing components according to embodiments of the present disclosure.
Figure 6B:
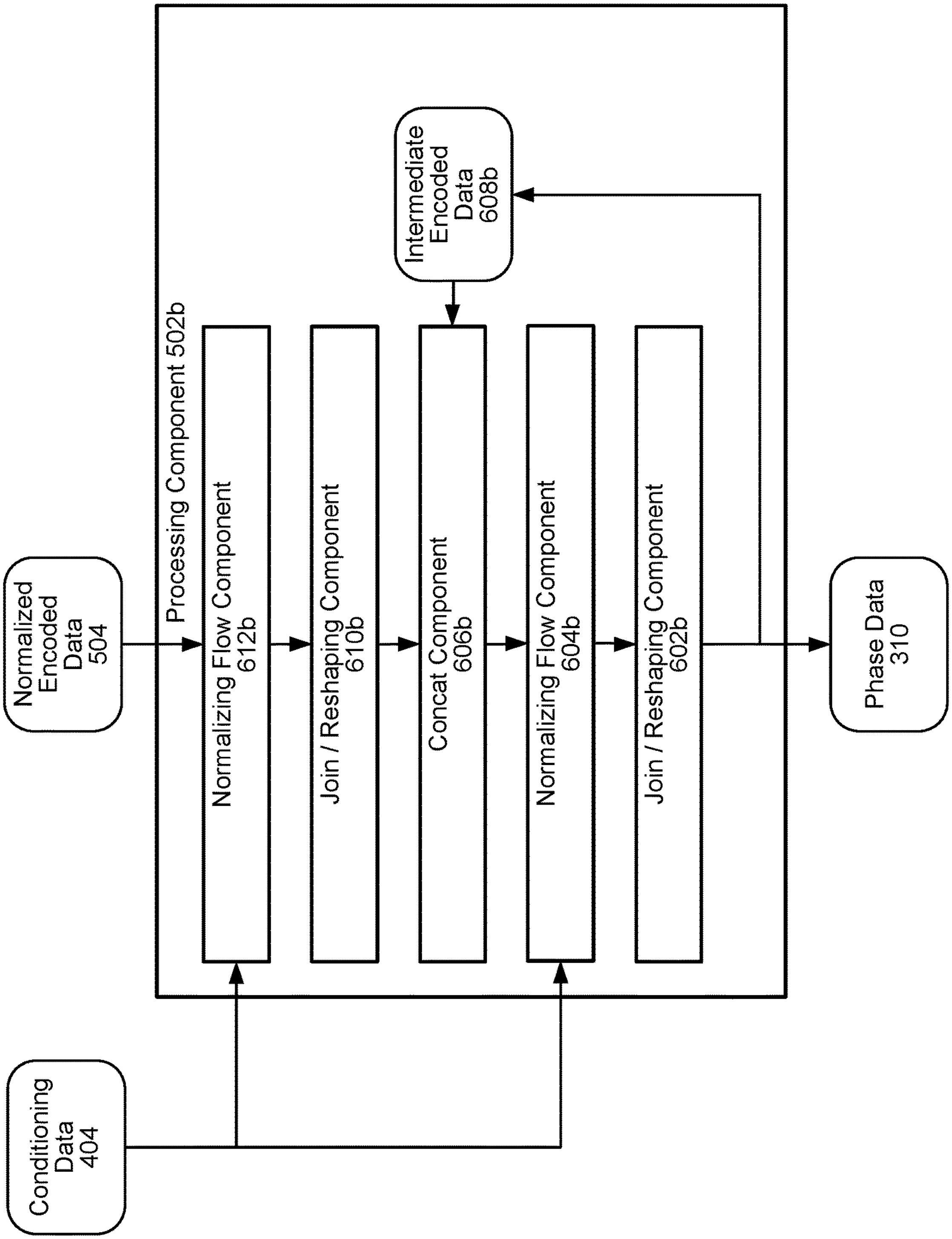

FIGS. 6A and 6B illustrate voice processing components according to embodiments of the present disclosure. Referring first to FIG. 6A, the processing component 502*a* first receives and processes the power spectrogram data 306 with a first division/resizing component 602*a*. The first division/resizing component 602*a* may divide values of the power spectrogram data 306 into groups and/or may then alter the size (e.g., dimensions) of those groups. The first division/resizing component 602*a* may be referred to as a "squeeze" component that performs a squeezing operation on the power spectrogram data 306. For example, the first division/resizing component 602*a* may reshape a 4×4×1 tensor of the power spectrogram data 306 into a 2×2×4 tensor.

The output of the first division/resizing component 602*a* may then be processed by a first normalizing flow component 604*a*, one embodiment of which is described in greater detail below with reference to FIGS. 7A and 7B. The first normalizing flow component 604*a* may produce an output and then re-process that output to create a second output. The first normalizing flow component 604*a* may thus re-process its produced output for a number of iterations; in some embodiments, 10-100 iterations. As explained in greater detail below, the first normalizing flow component 604*a* may perform (among other operations) an invertible 1×1 convolution on the output of the first division/resizing component 602*a*.

A split component 606*a* may then split the output of the first normalizing flow component 604*a*; a first portion of the output of the first normalizing flow component 604*a* may be processed by a second division/reshaping component 610*a* (e.g., a second squeezing-operation component) and a second portion of the output of the first normalizing flow component 604*a* may be re-processed by the first division/reshaping component 602*a*. This second portion may be referred to as intermediate encoded data 608*a*. The first division/reshaping component 602*a*, the first normalizing flow component 604*a*, and the split component 606*a* may thus process the power spectrogram data 306 a number of times to create a number of items of intermediate encoded data 608*a*. In other words, the first normalizing flow component 604*a*, and the split component 606*a* may form a loop having a number of iterations. This number of iterations may be the same as or different from the number of iterations of the first normalizing flow component 604*a*.

A second division/resizing component 610*a* may then perform a second squeeze operation on the output of the split component 606*a*. This second squeeze operation may be the same as or different from the first squeeze operation of the first division/resizing component 602*a*. Like the first division/resizing component 602*a*, the second division/resizing component 610*a* may reshape a dimension of the output of the split component 606*a* (e.g., reshape a 4×4×1 tensor into a 2×2×4 tensor). A second normalizing flow component 612*a*, which may be the same as or different from the first normalizing flow component 602*a*, may then process the output of the second division/reshaping component 610*a* to generate the normalized encoded data 504. The second normalizing flow component 612*a* may iterate a number of times to produce the normalized encoded data 504; this number of iterations may be the same as or different from the number of iterations of the first normalizing flow component 604*a*.

As illustrated, the processing component 502*a* includes the above-described processing components. The present disclosure is not, however, limited to only these components and/or to the order of operations described. In some embodiments, for example, the processing component 502*a* includes only the first division/reshaping component 602*a*, whose output is processed with only the first normalizing flow component 604*a*.

Referring to FIG. 6B, the normalizing flow decoder 308 processes the normalized encoded data 504 conditioned upon the conditioning data 404 to generate the phase data 310. The normalizing flow decoder 308 may perform the inverse of each processing component of the first processing component 502*a* in the reverse order and for the same number of iterations. A first normalizing flow component 612*b* may thus first process the normalized encoded data 504 for the same number of iterations as did the second normalizing flow component 612*a* of the first processing component 502*a*. A first join/reshaping component 610*b* may then perform a join/reshaping operation (e.g., the opposite of the squeeze operation described above). For example, the first join/reshaping component 610*b* may reshape a 2×2×4 tensor into a 4×4×1 tensor. A concat component 606*b* may concatenate intermediate encoded data 608*b* with the output of the first join/reshaping component 610*b* (e.g., the inverse of the operation of the split component 606*a*). A second normalizing flow component 604*b* may process the output of the concat component 606*b*, and a second join/reshaping component 602*b* may thereafter process the resultant output.

Figure 7A:
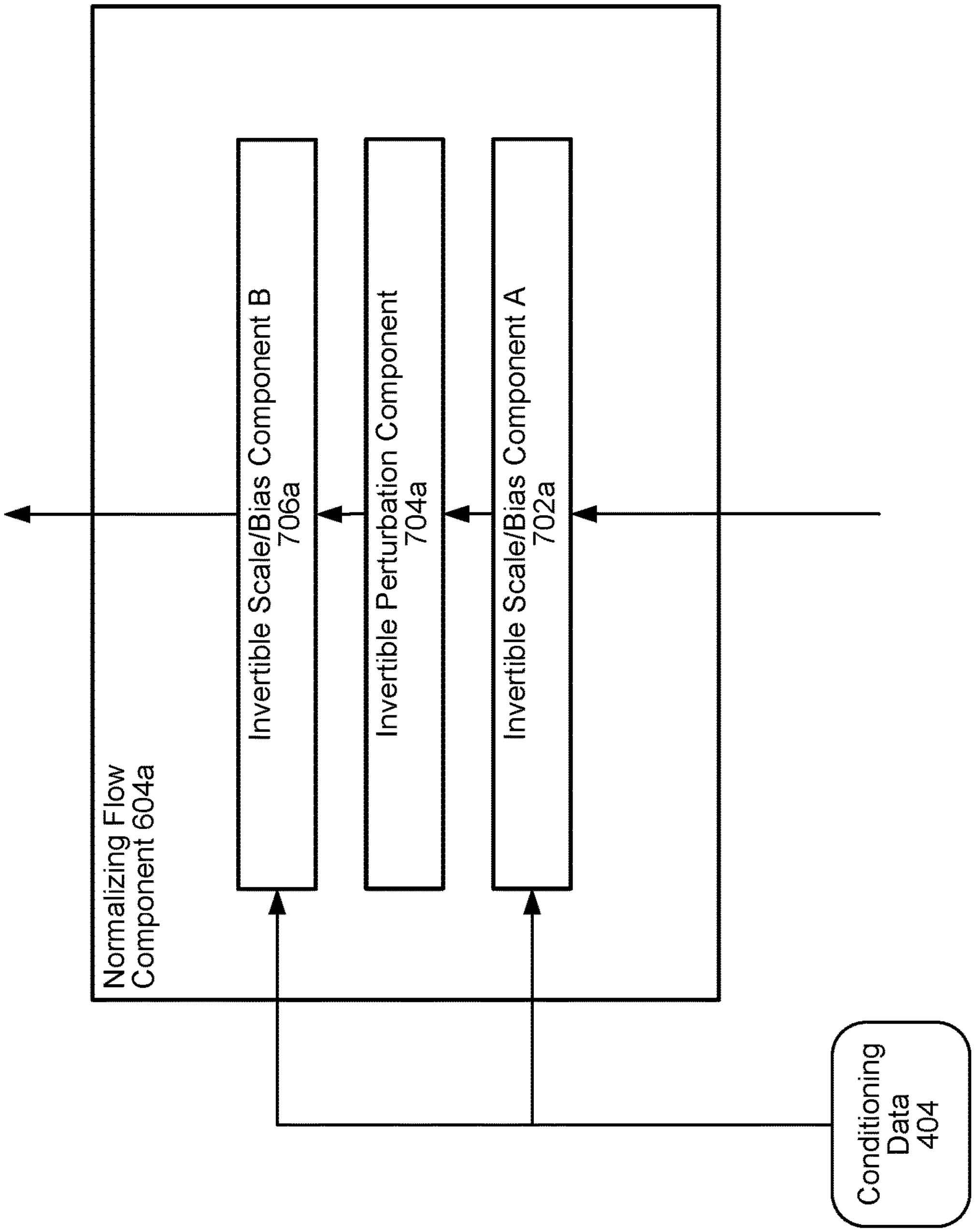
FIGS. 7A and 7B illustrate normalizing flow components according to embodiments of the present disclosure.
Figure 7B:
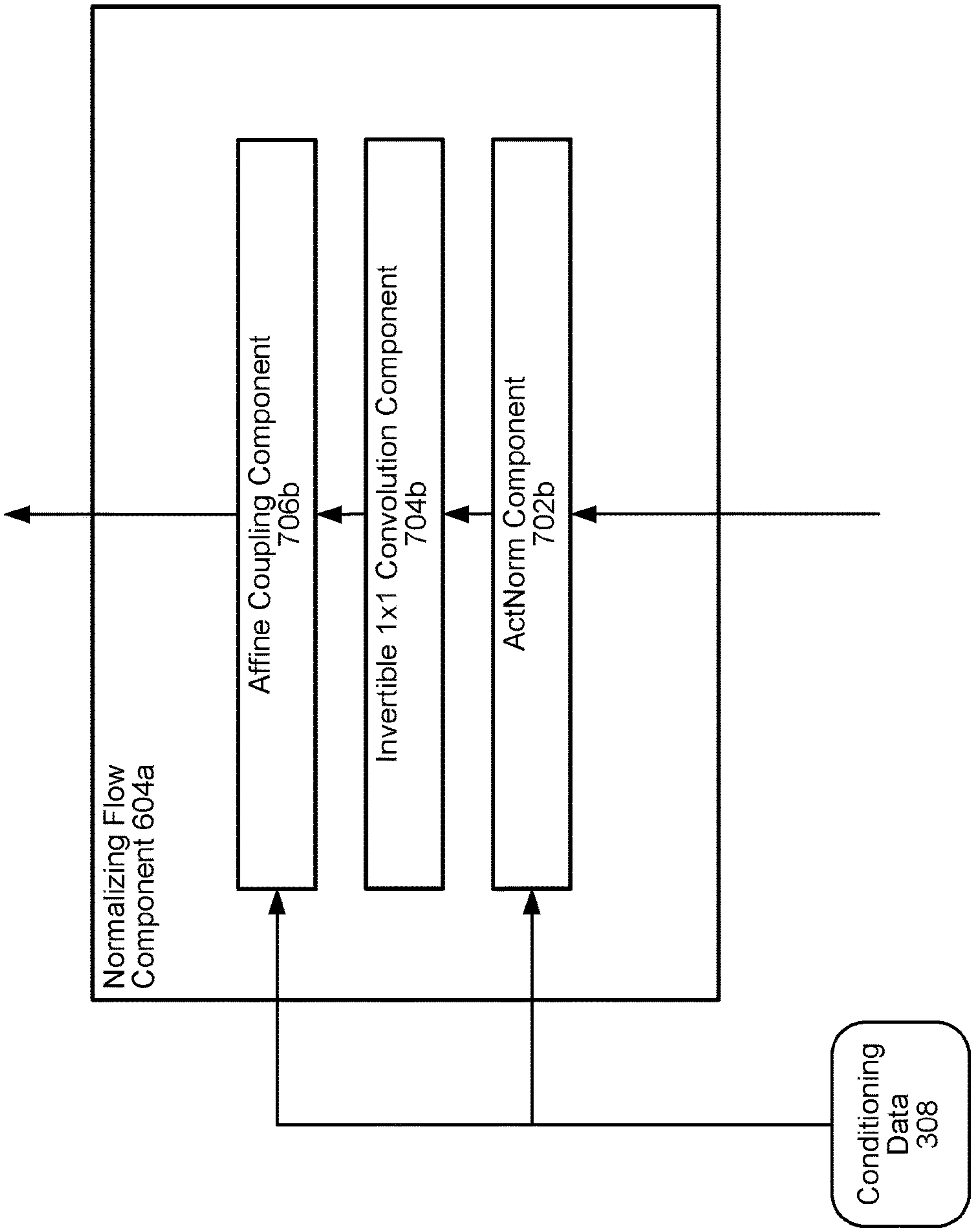

FIGS. 7A and 7B illustrate the normalizing flow component 604*a* according to embodiments of the present disclosure. The other normalizing flow components 612*a*, 604*b*, and 612*b* may be the same as or similar to the illustrated normalizing flow component 604*a*. As described above, the normalizing flow components 604*b* and 612*b* of the second processing component 502*b* may perform the inverse of the illustrated components in the reverse order (but for the same number of iterations).

A first invertible scale/bias component A 702*a* may first process the output of the division/reshaping component 602*a*. The first invertible scale/bias component A 702*a* may scale each value of its input data by multiplying it by a first value of the conditioning data 404 and may bias each value of its input data by adding a second value of the conditioning data 404. The first invertible scale/bias component A 702*a* may be referred to as an activation normalization or "actnorm" component 702*b*, as illustrated in FIG. 7B.

An invertible perturbation component 704*a* may then perform a perturbation operation on the output of the first invertible scale/bias component A 702*a*. This perturbation operation may be a 1×1 convolution operation, as illustrated by the 1×1 convolution component 704*b* of FIG. 7B. The perturbation component 704*a* may include a filter of dimension 1×1; this filter may transform a tensor of dimension h×w×c, wherein c is the number of channels of the tensor, into a matrix of size h×w. In other words, if the input of the invertible perturbation component 704*a* has a dimension 40×50×10 (for example), the output may have a dimension of 40×50×1. The perturbation component 704*a* may thus reduce a dimensionality of the output of the invertible scale/bias component A 702*a*.

A second invertible scale/bias component B 706*a* may then process the output of the invertible perturbation component 704*a* using the conditioning data 404. Like the first invertible scale/bias component A 702*a*, the second invertible scale/bias component B 706*a* may scale (e.g., multiply) each value of its input data and may bias (e.g., add to) each value of its input data. The values of the bias and scaling may be determined by the conditioning data 404. The second invertible scale/bias component B 706*a* may process the bias and/or scaled parameters with an exponential and/or logarithmic function before applying them to the input data values. In some embodiments, the second invertible scale/bias component B 706*a* may be referred to as an affine coupling component, such as the affine coupling component 706*b* of FIG. 7B.

Figure 8:
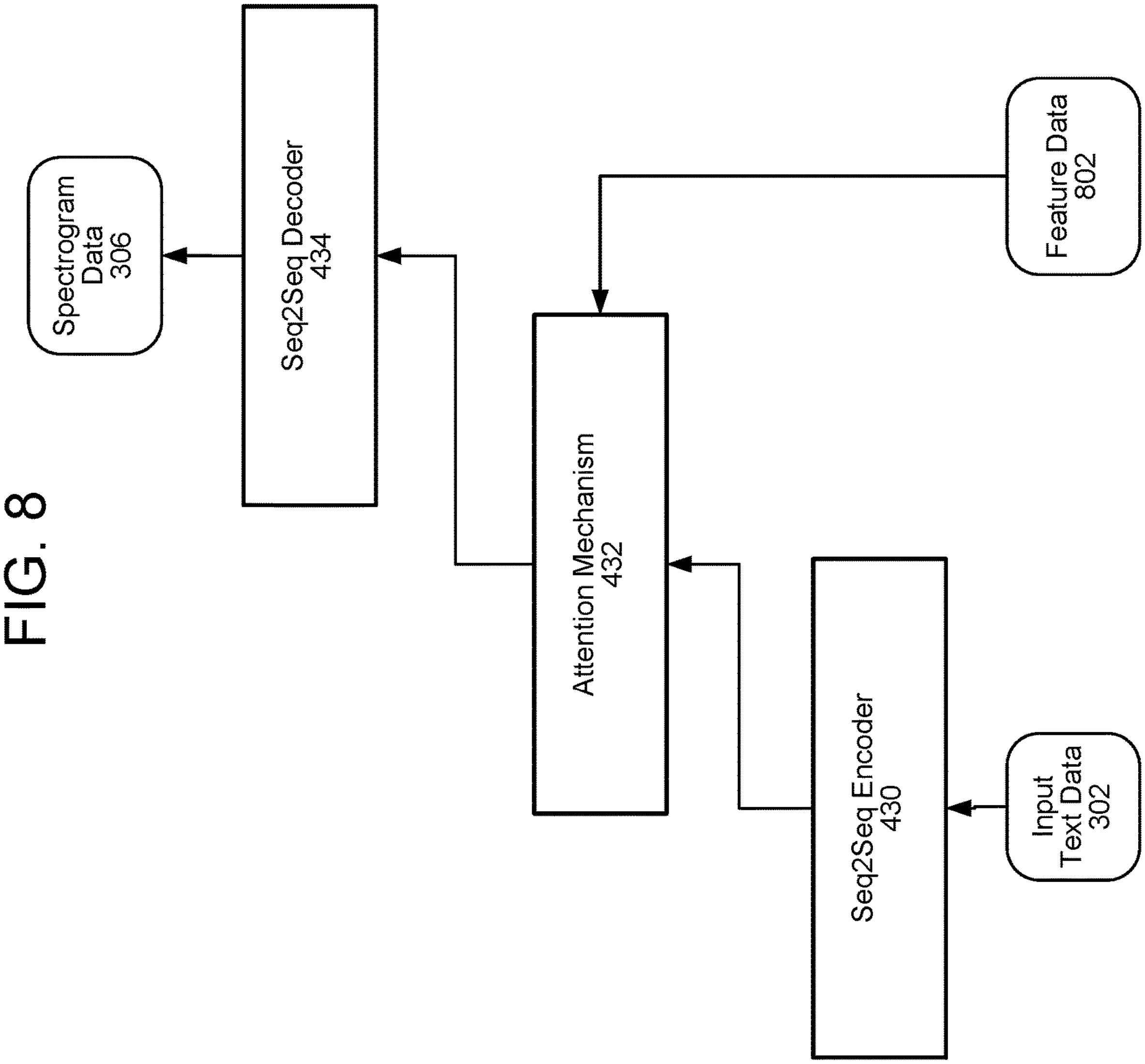
FIG. 8 illustrates a sequence-to-sequence component according to embodiments of the present disclosure.

FIG. 8 illustrates one embodiment of the spectrogram estimation component 304, which may be referred to as a sequence-to-sequence model. As shown, the spectrogram estimation component 304 includes a sequence-to-sequence encoder 430, an attention network 432, and a sequence-to-sequence decoder 434; this architecture may be referred to as a sequence-to-sequence or "seq2seq" model. The sequence-to-sequence encoder 430 is described in greater detail with reference to FIG. 9A; the a sequence-to-sequence decoder 434 is described in greater detail with reference to FIG. 9B The attention network 432 that may process the output encoded features 908 of the sequence-to-sequence encoder 430 in accordance with feature data 802 to determine attended encoded features 920. The attention network 432 may be a RNN, DNN, and/or other network discussed herein, and may include nodes having weights and/or cost functions arranged into one or more layers. Attention probabilities may be computed after projecting inputs to (e.g.) 128-dimensional hidden representations. In some embodiments, the attention network weights certain values of the outputs of the encoder 430 before sending them to the decoder 434. The attention network 432 may, for example, weight certain portions of the context vector by increasing their value and may weight other portions of the context vector by decreasing their value. The increased values may correspond to acoustic features to which more attention should be paid by the decoder 434 and the decreased values may correspond to acoustic feature to which less attention should be paid by the decoder 434.

Use of the attention network 432 may permit the encoder 430 to avoid encoding their entire inputs into a fixed-length vector; instead, the attention network 432 may allow the decoder 434 to "attend" to different parts of the encoded context data at each step of output generation. The attention network may allow the encoder 430 and/or decoder 434 to learn what to attend to.

Figure 9A:
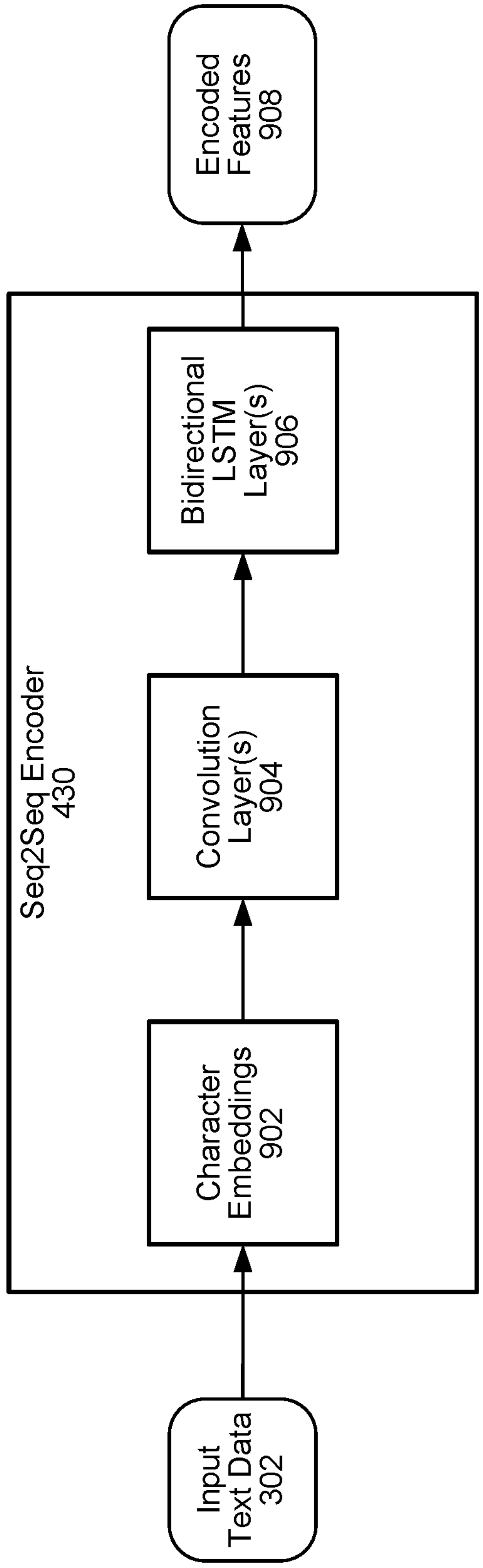
FIGS. 9A and 9B illustrate a sequence-to-sequence encoder and a sequence-to-sequence decoder according to embodiments of the present disclosure.

FIG. 9A illustrates one embodiment of the encoder 430; the present disclosure is not, however, limited to any particular embodiment of the encoder 430. The encoder 430 may receive input data, such as text data 302, and a character embeddings component 902 may create character embeddings based thereon. The character embeddings may represent the input text data 302 as a defined list of characters, which may include, for example, English characters (e.g., a-z and A-Z), numbers, punctuation, special characters, and/or unknown characters. The character embeddings may transform the list of characters into one or more corresponding vectors using, for example, one-hot encoding. The vectors may be multi-dimensional; in some embodiments, the vectors represent a learned 512-dimensional character embedding.

The character embeddings may be processed by one or more convolution layer(s) 904, which may apply one or more convolution operations to the vectors corresponding to the character embeddings. In some embodiments, the convolution layer(s) 904 correspond to three convolutional layers each containing 512 filters having shapes of 5×1, i.e., each filter spans five characters. The convolution layer(s) 904 may model longer-term context (e.g., N-grams) in the character embeddings. The final output of the convolution layer(s) 904 (i.e., the output of the only or final convolutional layer) may be passed to bidirectional LSTM layer(s) 906 to generate output data, such as encoded features 908. In some embodiments, the bidirectional LSTM layer 906 includes 512 units: 256 in a first direction and 256 in a second direction.

Figure 9B:
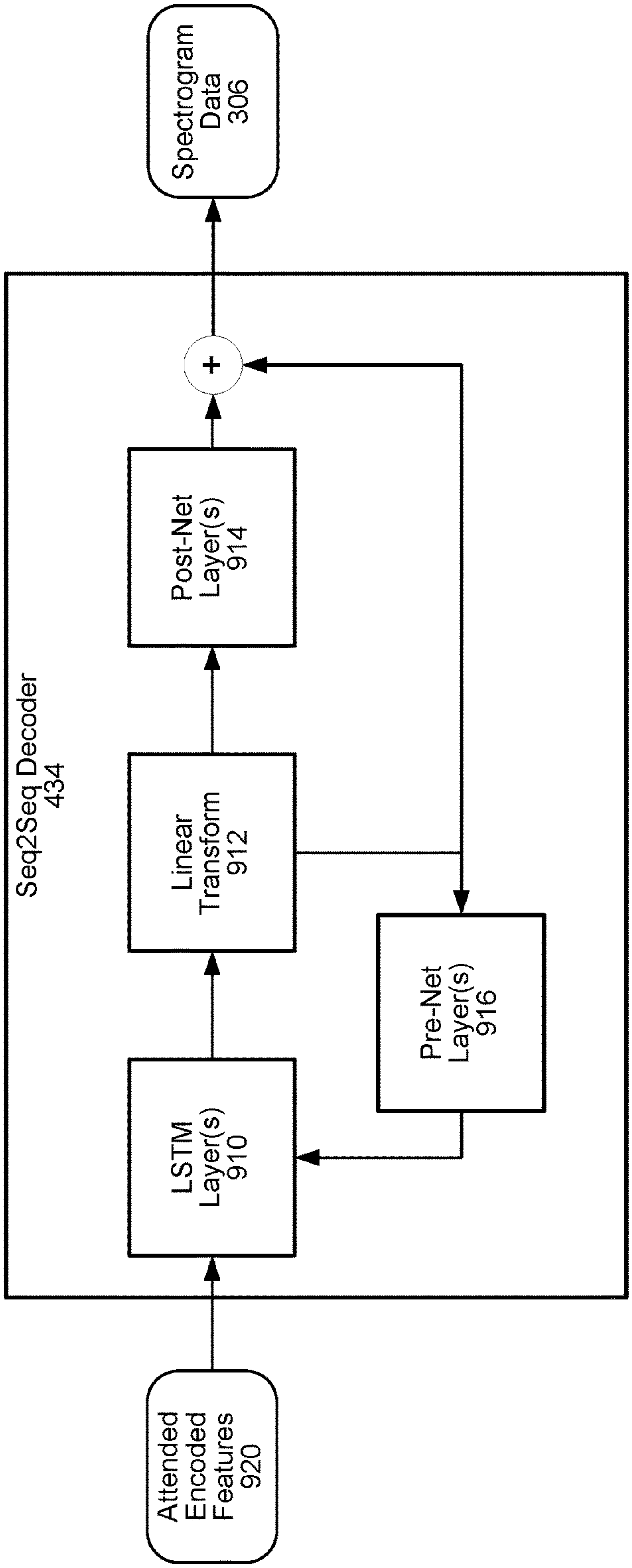

FIG. 9B illustrates one embodiment of one or more of the decoder 434; the present disclosure is not, however, limited to any particular embodiment of the decoder 434. The decoder 434 may be a network, such as a neural network; in some embodiments, the decoder is an autoregressive recurrent neural network (RNN). The decoder 434 may generate the encoded features 908 from the attended encoded features 920 one frame at a time. The attended encoded features 920 may represent a prediction of frequencies corresponding to the power spectrogram data 306. For example, if the attended encoded features 920 corresponds to speech denoting a fearful emotion, the power spectrogram data 306 may include a prediction of higher frequencies; if the attended encoded features 920 corresponds to speech denoting a whisper, the power spectrogram data 306 may include a prediction of lower frequencies. In some embodiments, the power spectrogram data 306 includes frequencies adjusted in accordance with a Mel scale, in which the power spectrogram data 306 corresponds to a perceptual scale of pitches judged by listeners to be equal in distance from one another. In these embodiments, the power spectrogram data 306 may include or be referred to as a Mel-frequency spectrogram and/or a Mel-frequency cepstrum (MFC).

The decoder 434 may include one or more pre-net layers 916. The pre-net layers 916 may include two fully connected layers of 256 hidden units, such as rectified linear units (ReLUs). The pre-net layers 916 receive power spectrogram data 306 from a previous time-step and may act as information bottleneck, thereby aiding the attention network 432 in focusing attention on particular outputs of the attention network 432. In some embodiments, use of the pre-net layer(s) 916 allows the decoder 434 to place a greater emphasis on the output of the attention network 432 and less emphasis on the power spectrogram data 306 from the previous time-temp.

The output of the pre-net layers 916 may be concatenated with the output of the attention network 432. One or more LSTM layer(s) 910 may receive this concatenated output. The LSTM layer(s) 910 may include two uni-directional LSTM layers, each having (e.g.) 1124 units. The output of the LSTM layer(s) 910 may be transformed with a linear transform 912, such as a linear projection. In other embodiments, a different transform, such as an affine transform, may be used. One or more post-net layer(s) 914, which may be convolution layers, may receive the output of the linear transform 912; in some embodiments, the post-net layer(s) 914 include five layers, and each layer includes (e.g.) 512 filters having shapes 5×1 with batch normalization. Tan h activations may be performed on outputs of all but the final layer. A concatenation element may concatenate the output of the post-net layer(s) 914 with the output of the linear transform 912 to generate the power spectrogram data 306.

In some embodiments, the user 10 inputs audio data representing speech instead of, or in addition to, the text data 14. The input audio data may be a series of samples of the audio 12; each sample may be a digital representation of an amplitude of the audio. The rate of the sampling may be, for example, 128 kHz, and the size of each sample may be, for example, 32 or 64 binary bits.

A spectrogram extraction component may process the samples in groups or "frames"; each frame may be, for example, 10 milliseconds in duration. The spectrogram extraction component may process overlapping frames of the input audio data; for example, the spectrogram extraction component may begin processing 10 millisecond frames every 1 millisecond. For each frame, the spectrogram extraction component may perform an operation, such as a Fourier transform and/or Mel-frequency conversion, to generate the power spectrogram data 306.

The spectrogram extraction component may further include a neural network, such as a convolutional neural network (CNN), that also processes the frames of the input audio data to determine the power spectrogram data 306. The spectrogram extraction component may thus encode features of the input audio data into the power spectrogram data 306. The features may correspond to non-utterance-specific features, such as pitch and/or tone of the speech, as well as utterance-specific features, such as speech rate and/or speech volume. Layers of the neural network may process frames of the input audio data in succession for the duration of the input audio data (e.g., a duration of an utterance represented in the input audio data).

Figure 10:
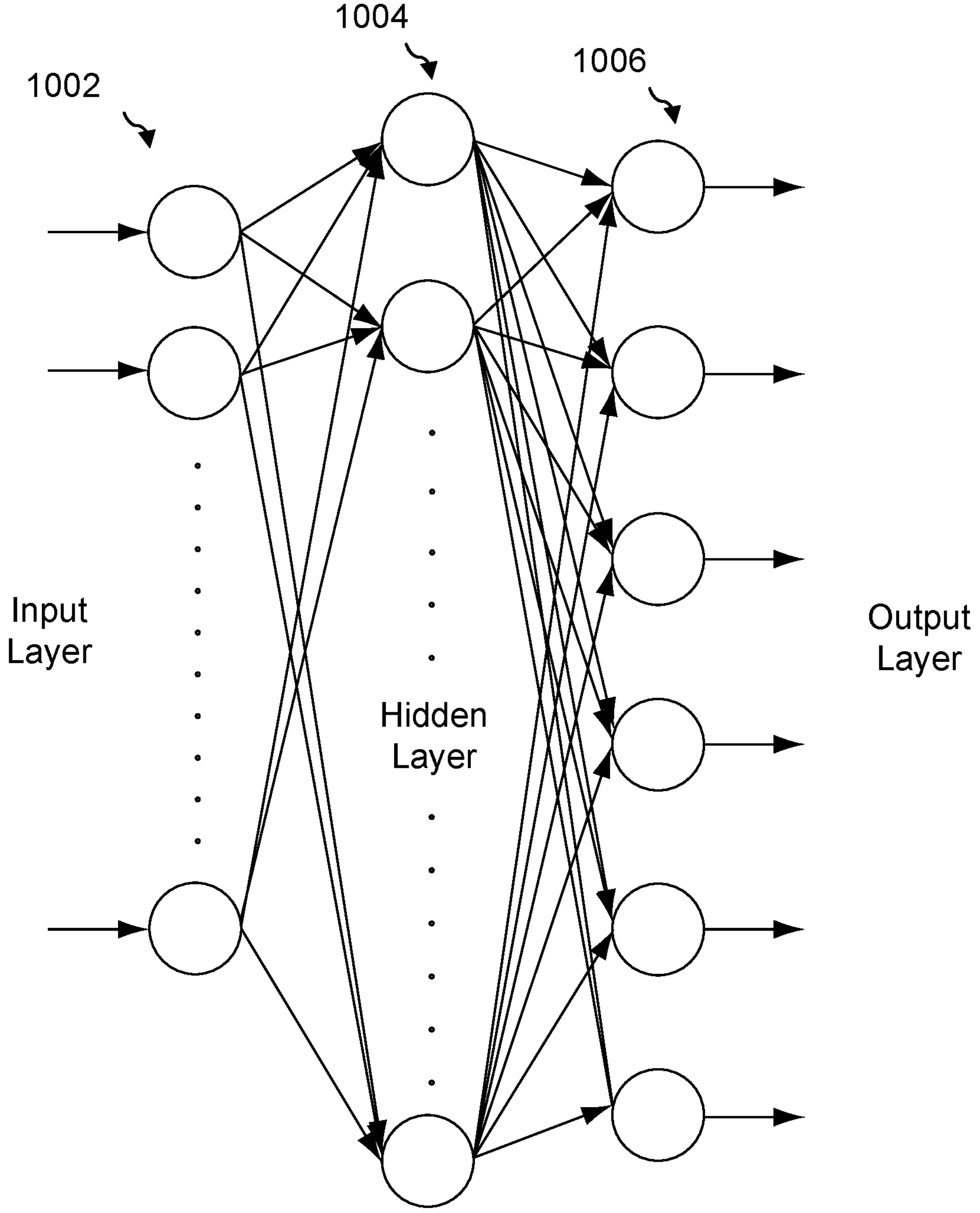
FIG. 10 illustrates a neural network for speech processing according to embodiments of the present disclosure.

An example neural network, which may be the normalizing flow encoder 420, the normalizing flow decoder 308, the encoder 430, the attention mechanism 432, and/or the decoder 434, is illustrated in FIG. 10. The neural network may include nodes organized as an input layer 1002, one or more hidden layer(s) 1004, and an output layer 1006. The input layer 1002 may include m nodes, the hidden layer(s) 1004 n nodes, and the output layer 1006 o nodes, where m, n, and o may be any numbers and may represent the same or different numbers of nodes for each layer. Nodes of the input layer 1002 may receive inputs (e.g., the audio data 302), and nodes of the output layer 1006 may produce outputs (e.g., the power spectrogram data 306). Each node of the hidden layer(s) 1004 may be connected to one or more nodes in the input layer 1002 and one or more nodes in the output layer 1004. Although the neural network illustrated in FIG. 10 includes a single hidden layer 1004, other neural networks may include multiple hidden layers 1004; in these cases, each node in a hidden layer may connect to some or all nodes in neighboring hidden (or input/output) layers. Each connection from one node to another node in a neighboring layer may be associated with a weight and/or score. A neural network may output one or more outputs, a weighted set of possible outputs, or any combination thereof.

The neural network may also be constructed using recurrent connections such that one or more outputs of the hidden layer(s) 1004 of the network feeds back into the hidden layer(s) 1004 again as a next set of inputs. Each node of the input layer connects to each node of the hidden layer; each node of the hidden layer connects to each node of the output layer. As illustrated, one or more outputs of the hidden layer is fed back into the hidden layer for processing of the next set of inputs. A neural network incorporating recurrent connections may be referred to as a recurrent neural network (RNN).

Processing by a neural network is determined by the learned weights on each node input and the structure of the network. Given a particular input, the neural network determines the output one layer at a time until the output layer of the entire network is calculated. Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with a lattice to improve speech recognition when the entire lattice is processed.

Figure 11:
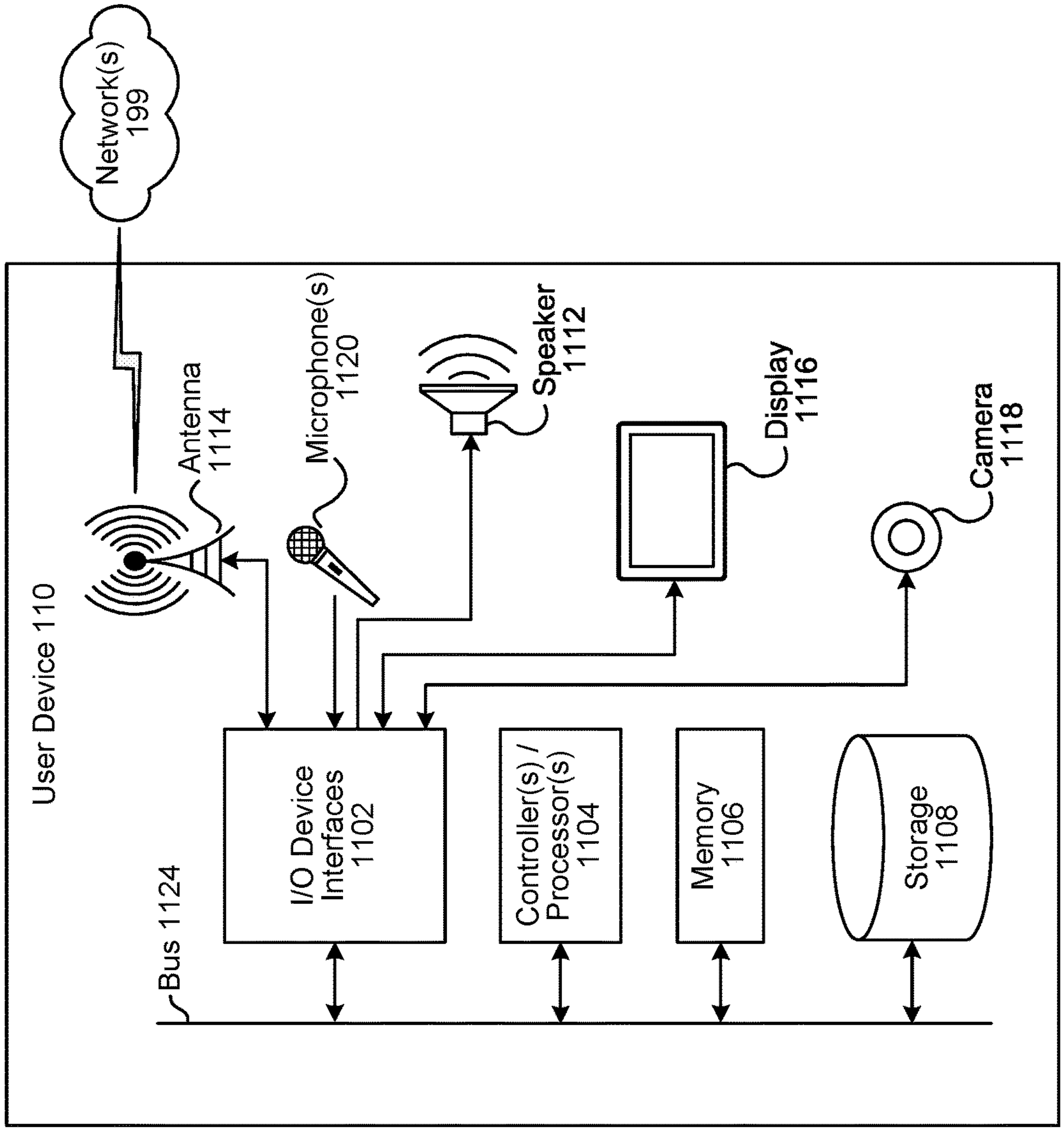
FIG. 11 illustrates components of a user device for synthetic speech processing according to embodiments of the present disclosure.
Figure 12:
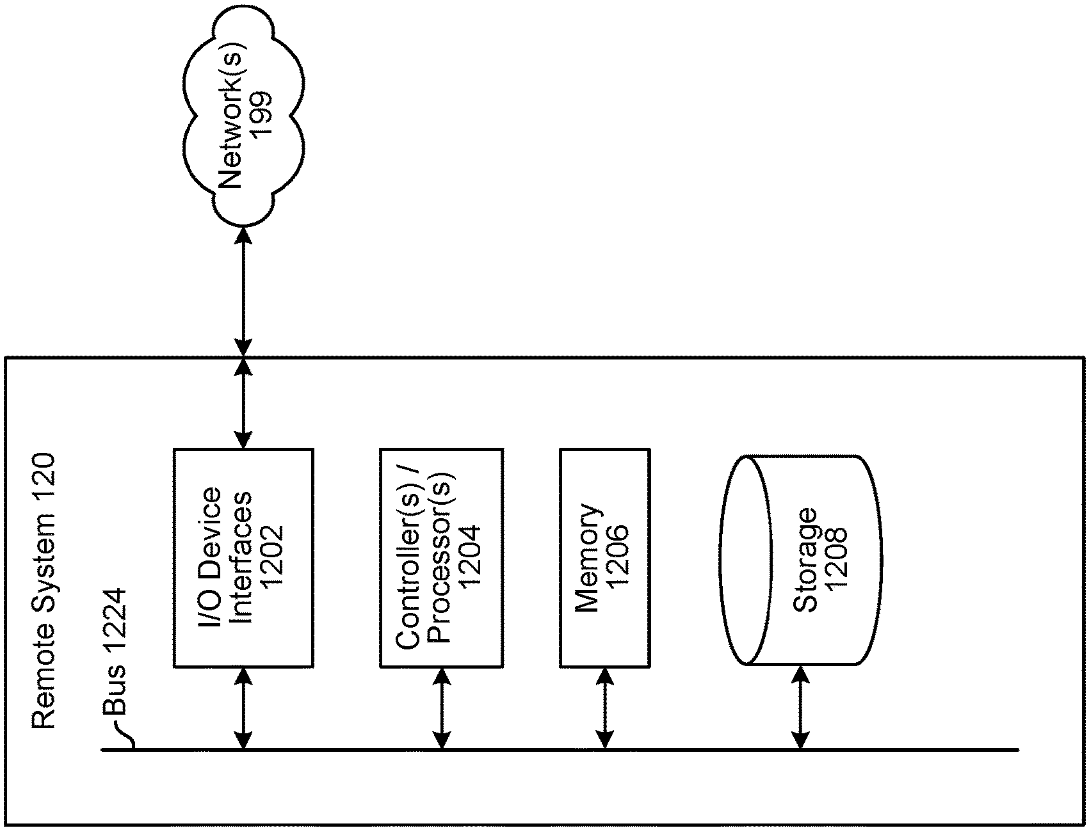
FIG. 12 illustrates components of a remote system for synthetic speech processing according to embodiments of the present disclosure.

FIG. 11 is a block diagram conceptually illustrating a user device 110. FIG. 12 is a block diagram conceptually illustrating example components of the system 120, which may be one or more servers and which may perform or assist with TTS processing. The term "system" as used herein may refer to a traditional system as understood in a system/client computing structure but may also refer to a number of different computing components that may assist with the operations discussed herein. For example, a server may include one or more physical computing components (such as a rack system) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server may be configured to operate using one or more of a client-system model, a computer bureau model, grid computing techniques, fog computing techniques, mainframe techniques, utility computing techniques, a peer-to-peer model, sandbox techniques, or other computing techniques.

Multiple servers may be included in the system 120, such as one or more servers for performing speech processing. In operation, each of these server (or groups of devices) may include computer-readable and computer-executable instructions that reside on the respective server, as will be discussed further below. Each of these devices/systems (110/120) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (110/120) may also include a data storage component (1108/1208) for storing data and controller/processor-executable instructions. Each data storage component (1108/1208) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1102/1202). The device 110 may further include loudspeaker(s) 1112, microphone(s) 1120, display(s) 1116, and/or camera(s) 1118.

Computer instructions for operating each device/system (110/120) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device/system (110/120) includes input/output device interfaces (1102/1202). A variety of components may be connected through the input/output device interfaces (1102/1202), as will be discussed further below. Additionally, each device (110/120) may include an address/data bus (1124/1224) for conveying data among components of the respective device. Each component within a device (110/120) may also be directly connected to other components in addition to (or instead of) being connected to other components across the bus (1124/1224).

Figure 13:
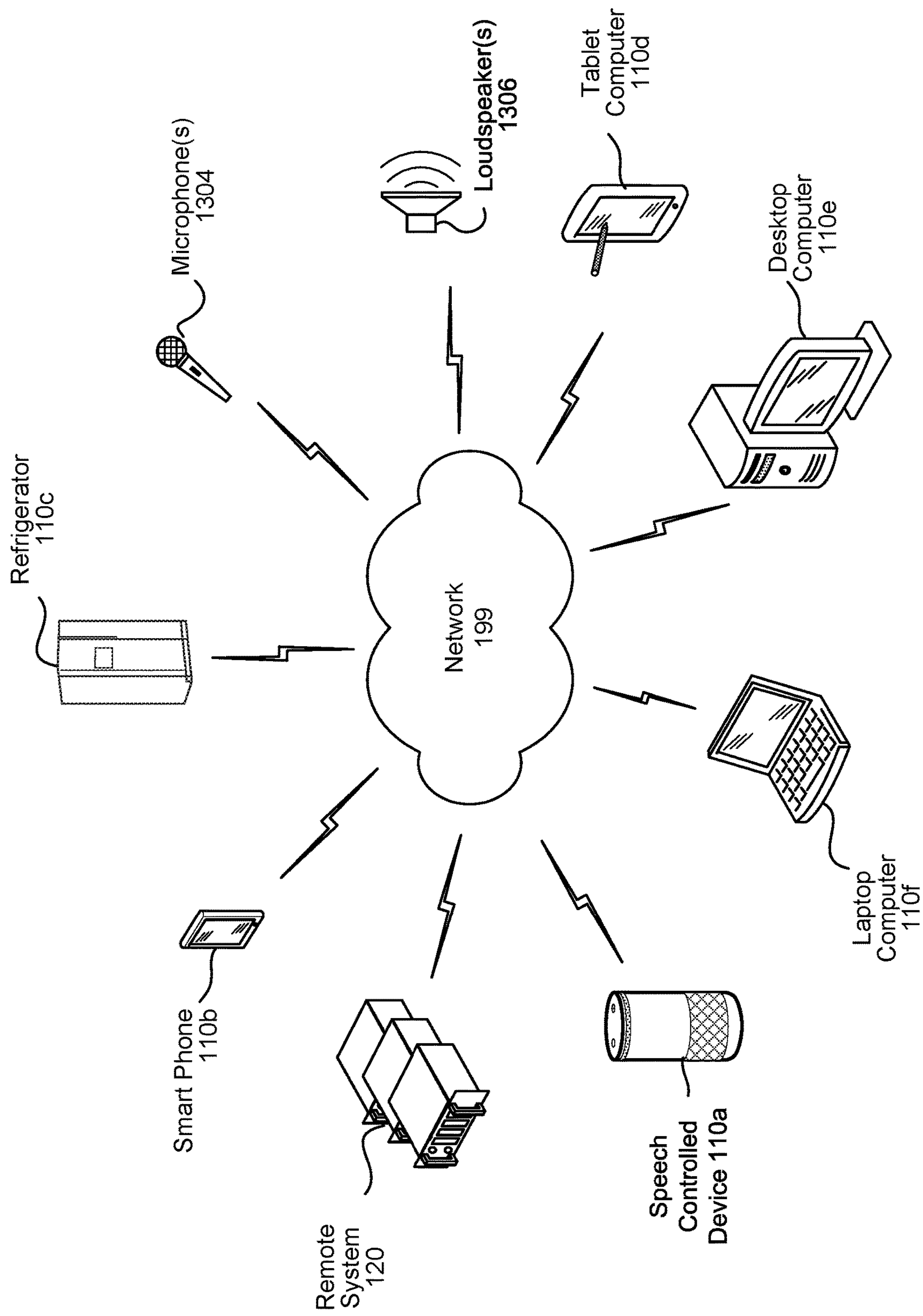
FIG. 13 illustrates a networked computing environment according to embodiments of the present disclosure.

Referring to FIG. 13, the device 110 may include input/output device interfaces 1102 that connect to a variety of components such as an audio output component (e.g., a microphone 1304 or a loudspeaker 1306), a wired headset, or a wireless headset (not illustrated), or other component capable of outputting audio. The device 110 may also include an audio capture component. The audio capture component may be, for example, the microphone 1304 or array of microphones, a wired headset, or a wireless headset, etc. If an array of microphones is included, approximate distance to a sound's point of origin may be determined by acoustic localization based on time and amplitude differences between sounds captured by different microphones of the array. The device 110 may additionally include a display for displaying content. The device 110 may further include a camera.

Via antenna(s) 1114, the input/output device interfaces 1102 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1102/1202) may also include communication components that allow data to be exchanged between devices such as different physical systems in a collection of systems or other components.

The components of the device(s) 110 and/or the system 120 may include their own dedicated processors, memory, and/or storage. Alternatively, one or more of the components of the device(s) 110 and/or the system 120 may utilize the I/O interfaces (1102/1202), processor(s) (1104/1204), memory (1106/1116), and/or storage (1108/1208) of the device(s) 110 and/or system 120.

As noted above, multiple devices may be employed in a single system. In such a multi-device system, each of the devices may include different components for performing different aspects of the system's processing. The multiple devices may include overlapping components. The components of the device 110 and/or the system 120, as described herein, are illustrative, and may be located as a stand-alone device or may be included, in whole or in part, as a component of a larger device or system.

The network 199 may further connect a speech controlled device 110*a*, a tablet computer 110*d*, a smart phone 110*b*, a refrigerator 110*c*, a desktop computer 110*e*, and/or a laptop computer 110*f* through a wireless service provider, over a WiFi or cellular network connection, or the like. Other devices may be included as network-connected support devices, such as a system 120. The support devices may connect to the network 199 through a wired connection or wireless connection. Networked devices 110 may capture audio using one-or-more built-in or connected microphones or audio-capture devices, with processing performed by components of the same device or another device connected via network 199. The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the components and engines may be implemented as in firmware or hardware, such as the acoustic front end, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for generating synthesized speech, the method comprising:

receiving text data representing content to be transformed into synthetic speech;

processing, using a sequence-to-sequence model, the text data to determine Mel-spectrogram data representing a characteristic of the synthetic speech;

processing the Mel-spectrogram data to determine amplitude data corresponding to the synthetic speech;

determining, using an affine coupling layer of a normalizing flow decoder and the amplitude data, a network weight of the normalizing flow decoder;

processing, using the normalizing flow decoder and the network weight, at least a portion of the Mel-spectrogram data to determine phase data representing the characteristic;

processing, using an inverse Fourier transform component, the Mel-spectrogram data and the phase data to determine audio data representing the synthetic speech; and causing output of audio corresponding to the audio data.

2. The computer-implemented method of claim 1, further comprising:

determining second text data representing second speech;

determining second audio data representing the second speech; and processing, using a normalizing flow encoder, the second text data and the second audio data to determine a Gaussian distribution, wherein the phase data is based at least in part on the Gaussian distribution.

3. A computer-implemented method comprising:

receiving first data representing content to be synthesized as audio data;

processing the first data to determine second data representing a power value of the audio data;

processing, using a decoder, at least a portion of the second data to determine third data representing a phase value of the audio data; and processing, using a first component, the second data and the third data to determine the audio data representing the content as synthesized speech.

4. The computer-implemented method of claim 3, further comprising:

processing the second data to determine amplitude data corresponding to the first data; and determining, using an affine coupling layer of the decoder and the amplitude data, a network weight of the decoder.

5. The computer-implemented method of claim 3, further comprising:

determining second audio data representing an utterance; and processing, using an encoder, the second audio data to determine a data distribution, wherein the third data is based at least in part on the data distribution.

6. The computer-implemented method of claim 3, further comprising at least one of:

processing the second data to determine amplitude data corresponding to the first data; and determining a data distribution corresponding to the second data, wherein the third data is based at least in part on the data distribution.

7. The computer-implemented method of claim 3, further comprising:

determining fourth data representing a second power value of second audio data;

determining fifth data representing a second phase value of the second audio data;

processing, using a sequence-to-sequence model, the fourth data to determine a first data distribution; and processing, using an encoder, the fifth data to determine a second data distribution.

8. The computer-implemented method of claim 3, further comprising:

processing second text data to determine fourth data representing a second power value of second audio data;

processing, using an encoder, the fourth data to determine embedding data;

determining that a variance of a value of the embedding data satisfies a condition; and processing, using the decoder, the value and at least a portion of the fourth data to determine a second phase value.

9. The computer-implemented method of claim 3, further comprising:

processing, using an encoder, a first frame of power data to determine first embedding data;

processing, using the encoder, a second frame of the power data to determine second embedding data; and processing, using a sequence-to-sequence model, the second embedding data to determine second audio data.

10. The computer-implemented method of claim 3, further comprising:

receiving second data representing second content;

processing, using an encoder of a sequence-to-sequence model, the second data to determine embedding data; and processing, using a second decoder, the embedding data to determine second audio data.

11. The computer-implemented method of claim 3, further comprising:

receiving second audio data representing an utterance;

processing, using a feature extractor, the second audio data to determine a second power value of second audio data;

processing, using the decoder, the second power value to determine a second phase value of the second audio data; and processing, using the first component, the second power value and the second phase value to determine third audio data that includes a representation of the utterance.

12. A system comprising:

at least one processor; and at least one memory including instructions that, when executed by the at least one processor, cause the system to:

receive first data representing content to be synthesized as audio data;

process the first data to determine second data representing a power value of audio data;

process, using a decoder, at least a portion of the second data to determine third data representing a phase value of the audio data; and process, using a first component, the second data and the third data to determine the audio data representing the content as synthesized speech.

13. The system of claim 12, wherein the at least one memory further includes instructions that, when executed by the at least one processor, further cause the system to:

process the second data to determine amplitude data corresponding to the first data; and determine, using an affine coupling layer of the decoder and the amplitude data, a network weight of the decoder.

14. The system of claim 12, wherein the at least one memory further includes instructions that, when executed by the at least one processor, further cause the system to:

determine second audio data representing an utterance; and process, using an flow encoder, the second audio data to determine a data distribution, wherein the third data is based at least in part on the data distribution.

15. The system of claim 12, wherein the at least one memory further includes instructions that, when executed by the at least one processor, further cause the system to:

process the second data to determine amplitude data corresponding to the first data; and determine a data distribution corresponding to the second data, wherein the third data is based at least in part on the data distribution.

16. The system of claim 12, wherein the at least one memory further includes instructions that, when executed by the at least one processor, further cause the system to:

determine fourth data representing a second power value of second audio data;

determine fifth data representing a second phase value of the second audio data;

process, using a sequence-to-sequence model, the fourth data to determine a first data distribution; and process, using an encoder, the fifth data to determine a second data distribution.

17. The system of claim 12, wherein the at least one memory further includes instructions that, when executed by the at least one processor, further cause the system to:

process second text data to determine fourth data representing a second power value of second audio data;

process, using an encoder, the fourth data to determine embedding data;

determine that a variance of a value of the embedding data satisfies a condition; and process, using the decoder, the value and at least a portion of the fourth data to determine a second phase value.

18. The system of claim 12, wherein the at least one memory further includes instructions that, when executed by the at least one processor, further cause the system to:

process, using an encoder, a first frame of power data to determine first embedding data;

process, using the encoder, a second frame of the power data to determine second embedding data; and process, using a sequence-to-sequence model, the second embedding data to determine second audio data.

19. The system of claim 12, wherein the at least one memory further includes instructions that, when executed by the at least one processor, further cause the system to:

receive second text data representing second content;

process, using an encoder of a sequence-to-sequence model, the second text data to determine embedding data; and process, using a second decoder, the embedding data to determine second audio data.

20. The system of claim 12, wherein the at least one memory further includes instructions that, when executed by the at least one processor, further cause the system to:

receive second audio data representing an utterance;

process, using a feature extractor, the second audio data to determine a second power value of second audio data;

process, using the decoder, the second power value to determine a second phase value; and process, using the first component, the second power value and the second phase value to determine third audio data that includes a representation of the utterance.

* * * * *